United States Patent
Kuroda et al.

(10) Patent No.: US 10,999,878 B2
(45) Date of Patent: May 4, 2021

(54) COMMUNICATION SYSTEM AND COMMUNICATION METHOD FOR IMPROVING SIGNAL PROCESSING EFFICIENCY

(71) Applicant: NEC Corporation, Tokyo (JP)

(72) Inventors: Satoshi Kuroda, Tokyo (JP); Toshiyuki Tamura, Tokyo (JP); Kazuo Watanabe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/070,191

(22) PCT Filed: Dec. 27, 2016

(86) PCT No.: PCT/JP2016/088813
§ 371 (c)(1),
(2) Date: Jul. 13, 2018

(87) PCT Pub. No.: WO2017/122531
PCT Pub. Date: Jul. 20, 2017

(65) Prior Publication Data
US 2019/0007984 A1    Jan. 3, 2019

(30) Foreign Application Priority Data
Jan. 15, 2016 (JP) .............................. JP2016-006030

(51) Int. Cl.
*H04W 76/10* (2018.01)
*H04W 64/00* (2009.01)
(Continued)

(52) U.S. Cl.
CPC ............. *H04W 76/10* (2018.02); *H04W 8/02* (2013.01); *H04W 64/00* (2013.01); *H04W 88/16* (2013.01); *H04W 92/24* (2013.01)

(58) Field of Classification Search
CPC ....... H04W 76/10; H04W 8/02; H04W 64/00; H04W 92/24; H04W 88/16;
(Continued)

(56) References Cited

U.S. PATENT DOCUMENTS

| | | | |
|---|---|---|---|
| 2014/0153544 A1* | 6/2014 | Lu ........................... | H04W 8/26 370/331 |
| 2015/0117408 A1* | 4/2015 | Kedalagudde .... | H04W 36/0027 370/331 |

(Continued)

OTHER PUBLICATIONS

Extended European Search Report issued in European Patent Application No. 16885131.9, dated Aug. 28, 2019, 8 pages.
(Continued)

*Primary Examiner* — Hoang-Chuong Q Vu

(57) ABSTRACT

A communication system capable of improving signal processing efficiency even when a plurality of connections are established is provided. A communication system according to the present invention includes a user plane PGW (14) configured to connect to a PDN, a user plane SGW (12) configured to relay user plane data between the user plane PGW (14) and a base station (34), and a control plane SGW (30). Further, the communication system includes a control apparatus (32) configured to, when a plurality of connections are established for the communication terminal (36), transmit information indicating that the user plane PGW (14) and the user plane SGW (12) can be integrally configured to the control plane SGW (30) for each of the plurality of connections.

5 Claims, 15 Drawing Sheets

(51) Int. Cl.
  *H04W 8/02* (2009.01)
  *H04W 88/16* (2009.01)
  *H04W 92/24* (2009.01)
(58) Field of Classification Search
  CPC ... H04W 36/0027; H04W 76/15; H04W 8/20; H04W 76/16; H04W 92/14; H04W 48/17
  See application file for complete search history.

(56) References Cited

U.S. PATENT DOCUMENTS

| | | | | |
|---|---|---|---|---|
| 2015/0201452 | A1* | 7/2015 | Wang | H04W 76/14 455/426.1 |
| 2016/0006625 | A1* | 1/2016 | Javed | H04L 43/026 370/253 |
| 2016/0157274 | A1* | 6/2016 | Akiyoshi | H04W 88/16 370/254 |
| 2016/0277956 | A1* | 9/2016 | Lindheimer | H04W 36/22 |
| 2016/0337454 | A1* | 11/2016 | Hoffmann | H04L 47/72 |
| 2017/0099623 | A1* | 4/2017 | Shi | H04W 8/02 |
| 2017/0126618 | A1* | 5/2017 | Bhaskaran | H04L 61/2015 |
| 2017/0163727 | A1* | 6/2017 | Dolby | H04L 12/4633 |
| 2017/0195930 | A1* | 7/2017 | Tomici | H04W 76/12 |
| 2017/0332296 | A1* | 11/2017 | Nilsson | H04W 76/11 |
| 2017/0366960 | A1* | 12/2017 | Kim | H04W 76/12 |
| 2018/0192456 | A1* | 7/2018 | Li | H04W 76/14 |

OTHER PUBLICATIONS

Nokia, Allot Communications, Alcatel-Lucent Shanghai Bell "Selection Mechanism for UP Entity", SA WG2 Temporary Document, SA WG2 Meeting #116, S2-163658 (revision of S2-16xxxx), Jul. 11-15, 2016, Vienna, Austria, pp. 1-4 (4 pages).

ZTE "Architecture Proposal for CUPS" SA WG2 Temporary Document, SA WG2 Meeting #111, S2-153136 (revision of S2-15xxxx), Oct. 19-23, 2015, ChengDu, China, pp. 1-3 (3 pages).

3GPP TS 23.401 V13.5.0 (Dec. 2015); 3rd Generation Partnership Project; Technical Specification Group Services and System Aspects; General Packet Radio Service (GPRS) enhancements for Evolved Universal Terrestrial Radio Access Network (E-UTRAN) access, (Release 13), 337 pages.

Cisco, "Solution to key issue#2: Selection mechanism for user plane functional entities", 3GPP TSG-SA WG2 Meeting #112, S2-154421, Nov. 16-20, 2015; paragraph 6.2, 3 pages.

Nokia Networks, "Control plane and User plane functional split for S-GW, P-GW and TDF", 3GPP TSG-SA WG2 Meeting #112, S2-153950, Nov. 16-20, 2015, paragraph 6.1; 5 pages.

Ericsson, "Functional split", 3GPP TSG-SA WG2 Meeting #112, S2-153863, Nov. 16-20, 2015, 5 pages.

International Search Report corresponding to PCT/JP2016/088813, dated Feb. 21, 2017, 1 page.

* cited by examiner

| NODE SELECTION USING DNS | DNS_INPUT | DNS_OUTPUT |
|---|---|---|
| PGW | TAI_1, APN_1 | PGW-C40 |
| PGW | TAI_1, APN_2 | PGW-C41 |
| SGW | TAI_1 | SGW-C30 | exit
COMMUNICATION SYSTEM AND COMMUNICATION METHOD FOR IMPROVING SIGNAL PROCESSING EFFICIENCY

CROSS-REFERENCE TO RELATED APPLICATIONS

This application is a national stage application of International Application No. PCT/JP2016/088813 entitled "COMMUNICATION SYSTEM AND COMMUNICATION METHOD," filed on Dec. 27, 2016, which claims the benefit of the priority of Japanese Patent Application No. 2016-006030 filed on Jan. 15, 2016, the disclosures of each of which are hereby incorporated by reference in their entirety.

TECHNICAL FIELD

The present disclosure relates to a communication system, a control apparatus, a communication method, and a program. In particular, the present disclosure relates to a communication system, a control device, a communication method, and a program for enabling a communication terminal to establish a plurality of connections.

BACKGROUND ART

In 3GPP (3rd Generation Partnership Project) in which standards for mobile communication systems have been drawn up, operations of node apparatuses and the like constituting a mobile network have been defined. For example, Non-patent Literature 1 discloses an Attach process for registering a communication terminal such as a mobile phone in a network.

Specifically, Non-patent Literature 1 discloses, in Section 4.2, a configuration of a mobile network including a UE (User Equipment), an eNB (evolved Node B), an MME (Mobility Management Entity), an SGW (Serving Gateway), a PGW (Packet Data Network Gateway), and an HSS (Home Subscriber Server). The UE is a general term for communication terminals such as mobile phones. The eNB is a base station that supports LTE (Long Term Evolution) as a radio communication method. The MME is a communication apparatus that performs mobility management of UEs, control of communication paths for user data in the mobile network, and so on. The SGW and PGW are gateways that relay user data. The SGW is disposed in each predetermined area and accommodates UEs. The PGW is a gateway connected to an external network and is disposed for each service to be provided (for each APN (Access Point Name)).

Further, Non-patent Literature 1 discloses, in Section 5.3.2, an Attach process. Further, it discloses, in Section 5.10, a process for establishing a plurality of PDN (Packet Data Network) connections that is performed when a UE receives a service related to a plurality of APNs. Establishment of a plurality of PDN connections may also be referred to as Multiple-PDN Connections or the like. Regarding the PDN connection, a PGW that establishes a connection is defined for each APN. Therefore, when a plurality of PDN connections are established, the UE establishes a PDN connection with each of the plurality of PGWs through the eNB and the SGW.

Further, in order to improve efficiency of processing of signals that are transmitted between an SGW and a PGW, there is a gateway apparatus in which an SGW and a PGW are integrally formed (Section 4.3.15a.2).

CITATION LIST

Non Patent Literature

Non-patent Literature 1: 3GPP TS23.401 V13.5.0 (2015-12), Section 4.2, Section 4.3.15a.2, Section 5.3.2, Section 5.10

SUMMARY OF INVENTION

Technical Problem

It has been desired to improve signal processing efficiency even in the case disclosed in Non-patent Literature 1 in which a process for establishing a plurality of PDN connections is performed.

An object of the present disclosure is to provide a communication system and a communication method capable of further improving signal processing efficiency when at least one connection related to a communication terminal is established.

Solution to Problem

A communication system according to the present disclosure includes: a user plane gateway configured to transmit user data related to a communication terminal; and a control plane gateway separated from the user plane gateway, in which the control plane gateway selects the user plane gateway based on location information and an APN (Access Point Name) related to the communication terminal, and in the selected user plane gateway, a user plane SGW (Serving Gateway) and a user plane PGW (Packet Data Network Gateway) are integrally formed.

A communication method for a communication system according to the present disclosure includes: selecting, by a control plane gateway, a user plane gateway based on location information and an APN (Access Point Name) related to a communication terminal, the user plane gateway being separated from the control plane gateway; and transmitting, by the selected user plane gateway, user data related to the communication terminal, in which in the selected user plane gateway, a user plane SGW (Serving Gateway) and a user plane PGW (Packet Data Network Gateway) are integrally formed.

Advantageous Effects of Invention

According to the present disclosure, it is possible to provide a communication system and a communication method capable of further improving signal processing efficiency when at least one connection related to a communication terminal is established.

DESCRIPTION OF EMBODIMENTS

First Embodiment

Embodiments according to the present disclosure are described hereinafter with reference to the drawings. Firstly, a configuration example of a communication system according to a first embodiment of the present disclosure is described with reference to FIG. 1. A communication system shown in FIG. 1 includes an SGW-U (a user plane SGW) 12, a PGW-U (a user plane PGW) 14, an SGW-U 22, a PGW-U 24, an SGW-C (a control plane SGW) 30, a PGW-C (control plane PGW) 40, a PGW-C 41, an MME 44, an eNB 48, and a UE 50. The communication system shown in FIG. 1 has a configuration in which a control plane and a user plane are separated from each other. Further, the SGW-U and the PGW-U are formed as an integrated apparatus. The SGW-U and the PGW-U may also be expressed as co-located. Paths indicated by solid lines between node apparatuses indicate a C-Plane (a control plane), and tunnel-like paths indicated by using rectangles between node apparatuses indicate a U-Plane (a user plane).

Note that a gateway apparatus having functions of the SGW-U 12 and the PGW-U 14 may be used as a single apparatus for the user plane. A gateway apparatus having functions of the SGW-U 22 and the PGW-U 24 may be used as a single apparatus for the user plane. A control apparatus having functions of the MME 44 and the SGW-C 30 may be used as a single apparatus for the control plane. The eNB 48 may be a base station apparatus and the UE 50 may be a communication terminal.

Figure 1:
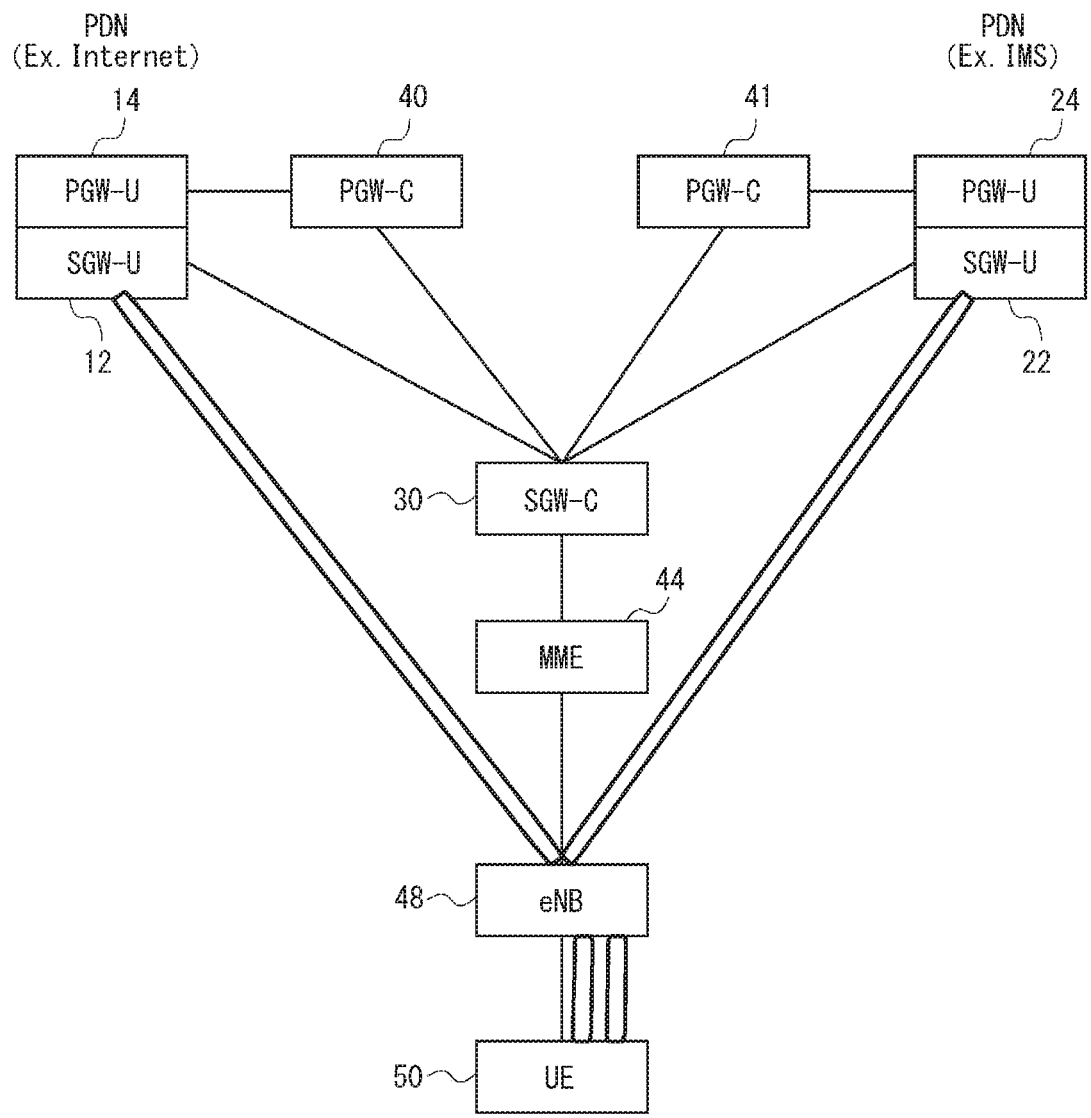
FIG. 1 is a configuration diagram of a communication system according to a first embodiment.

The communication system shown in FIG. 1 indicates that: a first PDN (Packet Data Network) connection is established by the UE 50, the eNB 48, the SGW-U 12, and the PGW-U 14; and a second PDN connection is established by the UE 50, the eNB 48, the SGW-U 22, and the PGW-U 24. The first PDN connection established by the UE 50, the eNB 48, the SGW-U 12, and the PGW-U 14 may be used for, for example, establishing an Internet connection. Further, the second PDN connection established by the UE 50, the eNB 48, the SGW-U 22, and the PGW-U 24 may be used for, for example, establishing a connection to an IMS (IP Multimedia Subsystem).

The SGW-C 30 selects an SGW-U. For example, the SGW-C 30 selects the SGW-U 12 or 22 to establish a PDN connection related to the UE 50. Further, the SGW-C 30 may select a PGW-U and notify a PGW-C that it has selected the PGW-U. For example, when the SGW-C 30 has selected the PGW-U 14 to establish a PDN connection related to the UE 50, it may notify the PGW-C 40 that it has selected the PGW-U 14.

When the MME 44 selects an SGW-C and selects a PGW-C, it inquires of a DNS holding their identification information or address information (a DNS query). In this process, the MME 44 can also acquire information indicating that the SGW-U and the PGW-U are co-located in addition to the information on the SGW-C and the PGW-C acquired from the DNS. Note that the DNS may also be referred to as a management apparatus. Specifically, in an extended DNS procedure, a PGW-C is selected while taking a TAI (Tracking Area Identity) into consideration. For example, when a PGW-C is found by using a combination of an APN (Access Point Name) and a TAI, the SGW-U and the PGW-U can be co-located. The MME 44 may acquire the APN from an HSS (Home Subscriber Server) and acquire the TAI from the eNB 48. The HSS manages subscriber information of the UE 50. Alternatively, when a PGW-C is found by using a combination of an APN (Access Point Name) and a TAI, and a canonical node name of the SGW-C matches a canonical node name of the PGW-C, the SGW-U and the PGW-U can be co-located. The canonical node name may be, for example, information indicating a partial domain name of an FQDN (Fully Qualified Domain Name). The TAI is information for identifying a TA which is a unit area for paging a UE in an idle state.

When the MME 44 finds that the SGW-U and the PGW-U are co-located, it performs the following process. In order to select an appropriate SGW-U and a PGW-U, the MME 44 sends an indication flag to the SGW-C 30 and the PGW-C 40, or to the SGW-C 30 and the PGW-C 41 by using a Create Session Request message, and thereby informs them that the SGW-U and the PGW-U are co-located.

Figure 2:
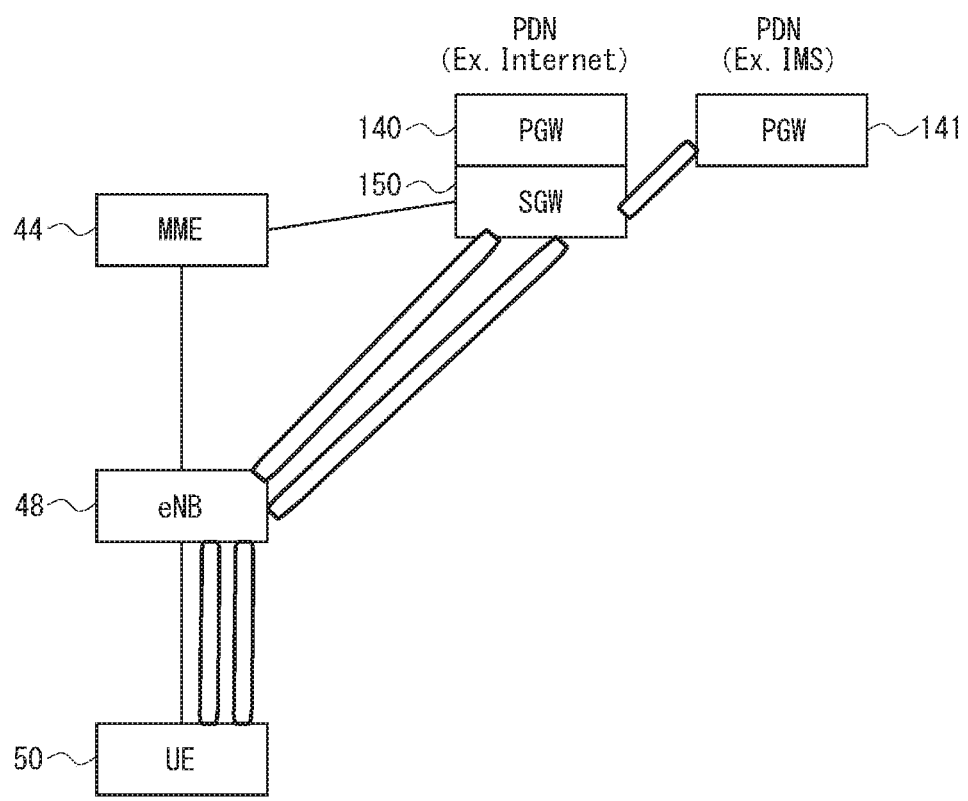
FIG. 2 is a diagram used for explaining an advantageous effect that is obtained when the communication system according to the first embodiment is used.

Advantageous effects that are obtained by using a communication system like the one shown in FIG. 1, in which an SGW is separated into an SGW-C and an SGW-U, and a PGW is separated into a PGW-C and a PGW-U, are explained with reference to FIG. 2. FIG. 2 shows that while a co-located PGW 140 and an SGW 150 are used for a first PDN connection for establishing an Internet connection, a PGW 141 that is not co-located with an SGW 150 is used for a second PDN connection for establishing a connection to an IMS. The PGW 140 used for establishing the Internet connection differs from the PGW 141 used for connecting to the IMS. Therefore, the PGW 141, which is not co-located with the SGW 150, is used for the second PDN connection for connecting to the IMS.

In contrast to this, in the communication system shown in FIG. 1, the SGW-C 30 selected in the MME 44 is separated from the SGW-U 12 that transmits/receives user plane data. The SGW-C 30 is a common SGW-C used to control a plurality of PDN connections.

Specifically, as described above, in the communication system shown in FIG. 1, when a PDN connection is established, the MME 44 can find a collocated SGW-U and a PGW-U. Further, the MME 44 notifies the SGW-C 30 that there are the co-located SGW-U and the PGW-U. Further, the SGW-C 30 can select the SGW-U 12 and the PGW-U 14 used for the first PDN connection, and select the SGW-U 22 and the PGW-U 24 used for the second PDN connection. Note that the SGW-C 30 selects the co-located SGW-U and the PGW for both of the first and second PDN connections. In this way, it is possible to use the co-located SGW-U and the PGW-U for both of the first and second PDN connections. As a result, even when a plurality of PDN connections are established, it is possible to improve signal processing efficiency in the communication system.

Specifically, by the above-described configuration, the first embodiment can reduce the number of tunnels in the communication system. For example, in FIG. 2 showing a configuration in which the present disclosure is not applied, two tunnels are required between the eNB and the SGW and one tunnel is required between the SGW and the PGW. That is, three tunnels are required in total. In contrast to this, in FIG. 1, one tunnel is formed between the eNB 48 and the SGW-U 12, and one tunnel is formed between the eNB 48 and the SGW-U 22. That is, there are only two tunnels in total and hence, compared to FIG. 2, the number of tunnels is reduced by one.

Further, in FIG. 2, up to the second PDN on the IMS side, it is necessary to set two paths, i.e., a path between the eNB 48 and the SGW 150 and a path between the SGW 150 and the PGW 141. In contrast to this, in FIG. 1, only one path needs to be set between the eNB 48 and the SGW-U 22.

Further, in FIG. 2, in the second PDN connection on the IMS side, it is necessary to convert a communication protocol between the SGW 150 and PGW 141 in order to perform tunneling control of the user plane. In contrast to this, in FIG. 1, when the SGW-U 22 and the PGW-U 24 form an integrated apparatus, it is unnecessary to convert a communication protocol between the SGW-U 22 and the PGW-U 24.

Further, in FIG. 2, it is necessary to perform a synchronization process between the SGW 150 and PGW 141. In contrast to this, in FIG. 1, when the SGW-U 22 and the PGW-U 24 form an integrated apparatus, it is unnecessary to perform a synchronization process between the SGW-U 22 and the PGW-U 24.

Second Embodiment

Figure 3:
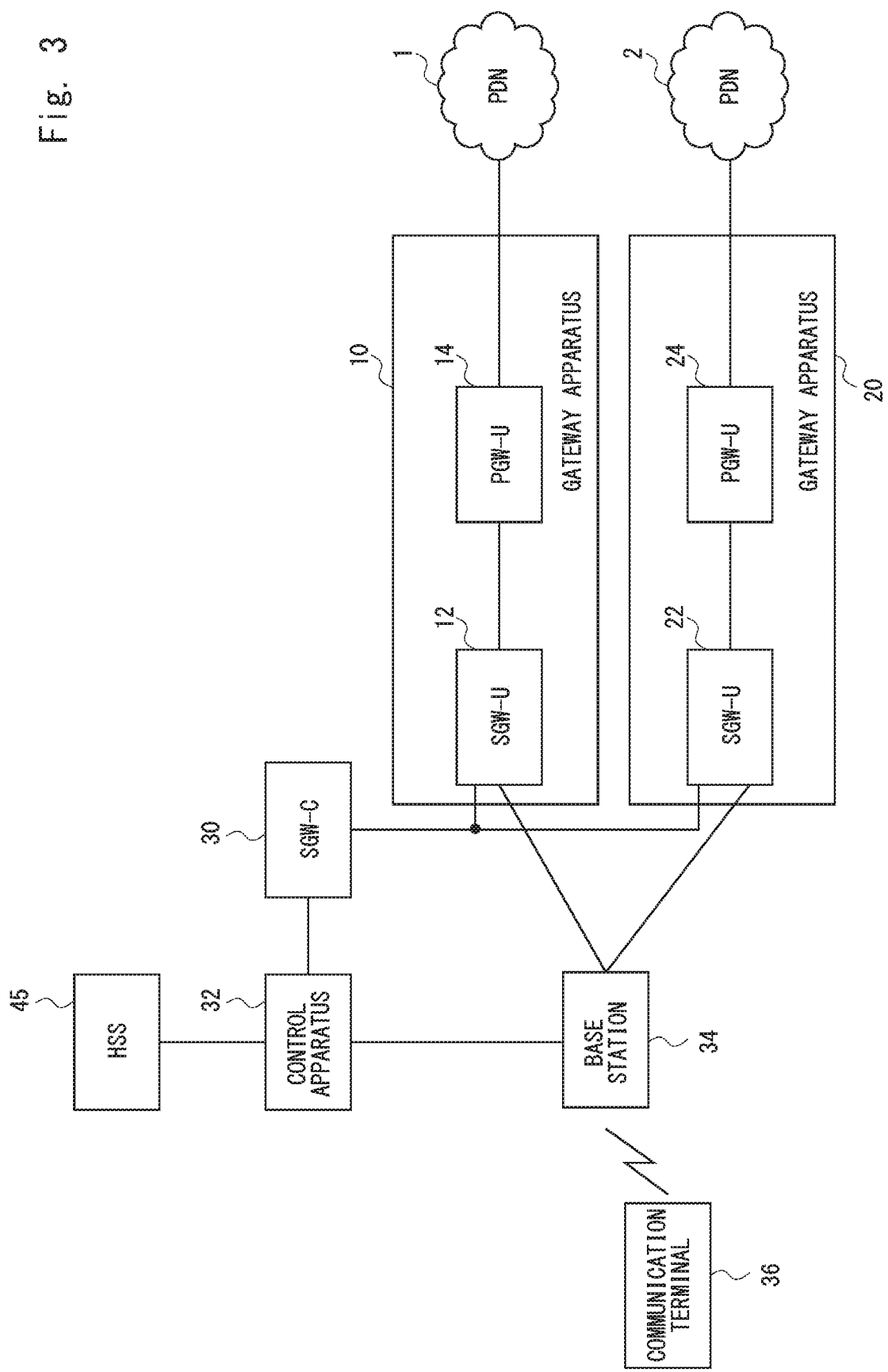
FIG. 3 is a configuration diagram of a communication system according to a second embodiment.

A communication system shown in FIG. 3 includes an HSS 45, a PDN 1, a PDN 2, a gateway apparatus 10, a gateway apparatus 20, an SGW-C (a control plane SGW) 30, a control apparatus 32, a base station 34, and a communication terminal 36.

The HSS 45, the gateway apparatus 10, the gateway apparatus 20, the SGW-C 30, the control apparatus 32, the base station 34, and the communication terminal 36 may be composed of a computer apparatus(s) that operates by having a processor execute a program stored in a memory.

The HSS 45, the gateway apparatus 10, the gateway apparatus 20, the SGW-C 30, and the control apparatus 32 are composed of an apparatus(s) constituting a core network. The PDNs 1 and 2 are packet networks located outside the core network. The PDNs 1 and 2 may be, for example, networks or the like managed by an IMS (IP Multimedia Subsystem) or an ISP (Internet Service Provider) specified in the 3GPP.

The APN is information that indicates, when the communication terminal 36 communicates with a PDN, a connection destination. That is, the APN is a name for identifying a PDN. By designating the APN, the communication terminal 36 can communicate with a desired PDN.

The communication terminal 36 is a computer apparatus having a communication function. For example, the communication terminal 36 may be a mobile phone terminal, a smartphone terminal, a tablet-type terminal, or the like. Alternatively, the communication terminal 36 may be an MTC (Machine Type Communication) terminal, a M2M (Machine to Machine) terminal, an IoT (Internet of Things) terminal, or the like, which autonomously perform communication without requiring a user's operation The base station 34 performs radio communication with the communication terminal 36 by using a predetermined radio communication method. The predetermined radio communication method may be, for example, LTE specified in the 3GPP, or a radio communication method called 3G, 2G, or the like.

The gateway apparatus 10 is an apparatus in which the SGW-U (the user plane SGW) 12 and the PGW-U (the user plane PGW) 14 are formed as an integrated apparatus (i.e., as a Collocated Gateway). In other words, the SGW-U 12 and the PGW-U 14 are co-located.

The PGW-U 14 connects to the PDN 1. The PGW-U 14 transmits user plane data related to the communication terminal 36 between the PGW-U 14 and the PDN 1. The SGW-U 12 relays user plane data transmitted between the PGW-U 14 and the base station 34. The SGW-U 12 and the PGW-U 14 are formed as an integrated apparatus. Therefore, data transmission between the SGW-U 12 and the PGW-U 14 is performed as an internal process in the apparatus. That is, when the SGW-U 12 is an apparatus different from the PGW-U 14, messages in the form of packet data are transmitted between the SGW-U 12 and the PGW-U 14. However, when the SGW-U 12 and the PGW-U 14 are formed as an integrated apparatus, messages in the form of packet data are not transmitted between the apparatuses, i.e., between the SGW-U 12 and the PGW-U 14.

The gateway apparatus 20 is an apparatus in which the SGW-U 22 and the PGW-U 24 are formed as an integrated apparatus (i.e., as a Collocated Gateway).

The PGW-U 24 connects to the PDN 2. The PGW-U 24 transmits user plane data related to the communication terminal 36 between the PGW-U 24 and the PDN 2. The SGW-U 22 relays user plane data transmitted between the PGW-U 24 and the base station 34. Note that the PGW-U 24 and the SGW-U 22 have a configuration similar to that of the PGW-U 14 and the SGW-U 12.

Meanwhile, the control plane SGW-C 30 is provided for common use by the gateway apparatus 10 and 20, and manages the SGW-Us 12 and 22. Although FIG. 1 indicates that the SGW-C 30 manages the SGW-Us 12 and 22, the SGW-C 30 may manage three or more SGW-Us. The fact that the SGW-C 30 manages the SGW-Us 12 and 22 may mean that, for example, the SGW-C 30 selects an SGW-U with which the base station 34 will perform communication between the SGW-Us 12 and 22. Alternatively, the fact that the SGW-C 30 manages the SGW-Us 12 and 22 may mean that, for example, the SGW-C 30 manages address information or the like related to the SGW-Us 12 and 22. The address information may be, for example, IP addresses.

When the control apparatus 32 establishes a plurality of connections for the communication terminal 36 by designating different APNs, it selects the SGW-C 30. Further, for each of the connections to be established, the control apparatus 32 transmits instruction information instructing to select a gateway apparatus in which a PGW-U and an SGW-U are formed as an integrated apparatus to the SGW-C 30.

User Plane Data related to the communication terminal 36 is transmitted to the gateway apparatus 10 or 20. Further, the user plane data related to the communication terminal 36 is received by the base station 34 from the gateway apparatus 10 or 20. The user plane data may also be referred to as User Data, U-Plane Data, or the like. In contrast to this, Control Plane Data related to the communication terminal 36 is transmitted from the base station 34 to the control apparatus 32 and further transmitted from the control apparatus 32 to the SGW-C 30. Further, the control plane data related to the communication terminal 36 is received by the base station 34 from the SGW-C 30 through the control apparatus 32. The control plane data may also be referred to as control data, C-Plane data, or the like.

The fact that a plurality of connections are established means that connections that the communication terminal 36 uses to communicate with PDNs 1 and 2 are established. In order to establish a connection used to communicate with the PDN 1, the communication terminal 36 designates an APN associated with the PDN 1. Further, in order to establish a connection used to communicate with the PDN 2, the communication terminal 36 designates an APN associated with the PDN 2. Further, the APNs associated with the PDNs 1 and 2 may be provided from the HSS 45 to the control apparatus 32 as subscriber data.

A connection is determined between the communication terminal 36 and the PDN 1 or 2. The connection may also be referred to as, for example, a PDN connection. Further, the PDN connection is composed of one or a plurality of communication bearers. By establishing a connection between the communication terminal 36 and the PDN 1 or 2, a communication path between the communication terminal 36 and the PDN 1 or 2 is determined.

The control apparatus 32 transmits instruction information to the SGW-C 30. The instruction information instructs to select, when the control apparatus 32 establishes, for example, a connection for which an APN associated with the PDN 1 is designated, the gateway apparatus 10, in which the SGW-U and the PGW-U are formed as an integrated apparatus, and also to select, when the control apparatus 32 establishes a connection for which an APN associated with the PDN 2 is designated, the gateway apparatus 20.

As described above, when a plurality of connections for the communication terminal 36 are established by designating different APNs, the control apparatus 32 can transmit instruction information instructing to select a gateway apparatus in which a PGW-U and an SGW-U are formed as an integrated apparatus to the SGW-C 30. That is, the SGW-C 30 is used as a common apparatus that controls a plurality of connections. Further, the SGW-C 30 and the control apparatus 32 may be formed as an integrated apparatus. By the above configuration, the second embodiment provides the same advantageous effects as those of the first embodiment. It is possible to reduce the number of tunnels in the communication system (specifically, the total number of tunnels between the base station 34 and each of the gateway apparatuses 10 and 20 is reduced to two), and to reduce the number of paths to the PDNs (specifically, the number of paths between the base station 34 and each of the gateway apparatuses 10 and 20 is reduced to one). Further, since user plane data is processed in the gateway apparatus, the need for the communication protocol conversion and the synchronization process, which would otherwise be required between the SGW 150 and the PGW 141 as shown in FIG. 2, is eliminated.

Further, in the second embodiment, by separating the SGW-C that transmits control plane data from the SGW-U, the connection established between the base station 34 and the PGW-U is separated from the SGW-C. As a result, even when the SGW-C 30 is used as a common apparatus that controls a plurality of connections, a different SGW-U can be used for each of the connections. Therefore, in each of the plurality of connections, it is possible to select the gateway apparatuses 10 and 20 in each of which the SGW-U and the PGW-U are integrally configured, and establish a connection between the base station 34 and the SGW-U 12 and a connection between the base station 34 and the SGW-U 22.

In this way, it is possible to use a gateway apparatus in each of the plurality of connections, and hence it is possible to prevent unnecessary messages from being transmitted between the apparatuses, i.e., between the SGW-U and the PGW-U.

Third Embodiment

Figure 4:
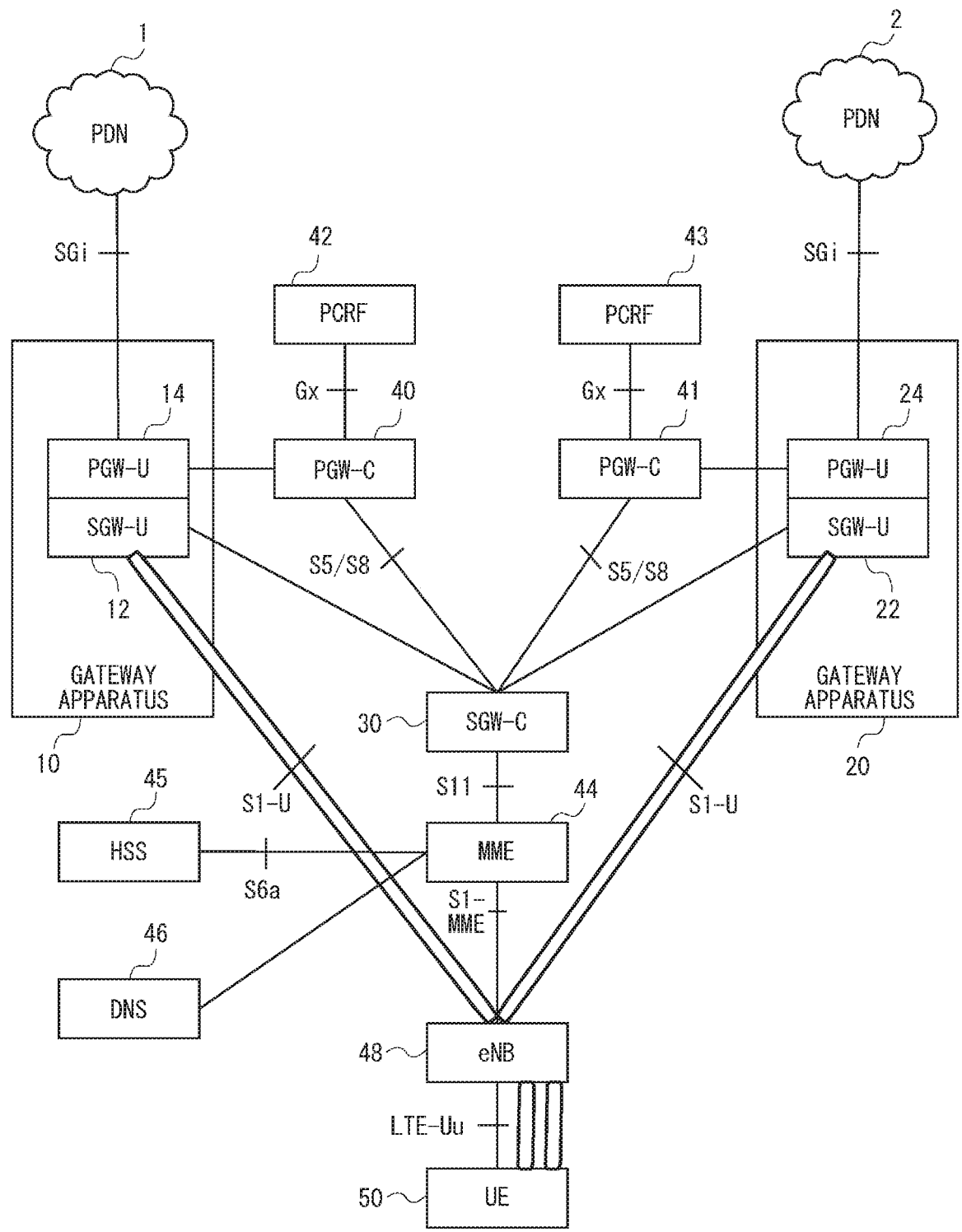
FIG. 4 is a configuration diagram of a communication system according to a third embodiment.

Next, a configuration example of a communication system according to a second embodiment of the present disclosure is described with reference to FIG. 4. In FIG. 4, the same symbols as those in FIGS. 1 and 3 are assigned to the same apparatuses as those in FIGS. 1 and 3. A communication system shown in FIG. 4 includes an HSS 45, a PDN 1, a PDN 2, a gateway apparatus 10, a gateway apparatus 20, an SGW-C 30, a PGW-C 40, a PGW-C 41, a PCRF (Policy Control and Charging Rules Function) 42, a PCRF 43, an MME (Mobility Management Entity) 44, a DNS (Domain Name System) 46, an eNB (evolved Node B) 48, and a UE (User Equipment) 50.

The UE 50 corresponds to the communication terminal 36 shown in FIG. 1. UE is used as a general term for mobile communication apparatuses in the 3GPP.

The HSS 45 is a node apparatus specified in the 3GPP and manages subscriber data of the UE 50.

The MME 44 corresponds to the control apparatus 32 shown in FIG. 3. The MME 44 is a node apparatus specified in the 3GPP and manages location information of the UE 50. The MME 44 is a communication apparatus that performs mobility management of the UE 50, control of communication paths for user data in a mobile network, and so on. The location information of the UE 50 may be, for example, a TA (Tracking Area) which is a unit area for paging the UE in an idle state.

The eNB 48 corresponds to the base station 34 shown in FIG. 3. The eNB 48 is a base station specified in the 3GPP and is a base station that supports LTE as a radio communication method.

The PGW-C 40 manages the PGW-U 14 and the PGW-C 41 manages the PGW-U 24. The fact that the PGW-C 40 manages the PGW-U 14 and the PGW-C 41 manages the PGW-U 24 may mean that, for example, the PGW-C 40 and the PGW-C 41 select PGW-Us which will connect with PDNs corresponding to designated APNs. Alternatively, the fact that the PGW-C 40 manages the PGW-U 14 and the PGW-C 41 manages the PGW-U 24 may mean that, for example, the PGW-C 40 manages address information or the like related to the PGW-U 14 and the PGW-C 41 manages address information or the like related to the PGW-U 24.

While the SGW-C 30, the PGW-C 40, and the PGW-C 41 transmit control plane data related to the UE 50, the SGW-U 12 and PGW-U 14, and the SGW-U 22 and PGW-U 24 transmit user plane data related to the UE 50. That is, in the communication system shown in FIG. 4, a communication path for control plane data related to the UE 50 is different from a communication path for user plane data related to the UE 50.

The PCRF 42 transmits control plane data between the PCRF 42 and the PGW-C 40. The PCRF 43 transmits control plane data between the PCRF 43 and the PGW-C 41. In communication with the PDN 1, the PCRF 42 performs policy control of communication related to the UE 50, accounting control related to the UE 50, or the like. In communication with the PDN 2, the PCRF 43 performs policy control of communication related to the UE 50, accounting control related to the UE 50, or the like.

In response to a request from the MME 44, the DNS 46 transmits identification information or address information of the SGW-C 30, the PGW-C 40, or the PGW-C 41 to the MME 44. The address information may include IP address information.

By using the communication system shown in FIG. 4, the UE 50 can simultaneously establish a PDN connection with the PDN 2 as well as with the PDN 1. Further, when the UE 50 establishes a plurality of PDN connections, the SGW-C 30 is used as the SGW-C that manages the SGW-U. Further, when the eNB 48 establishes PDN connections, the SGW-Us 12 and 22 are used as the SGW-U.

That is, when the MME 44 establishes a plurality of PDN connections, it selects the SGW-C 30 as a common SGW-C.

When the communication path for control plane data is the same as the communication path for user plane data, that is, when the SGW-C 30 and SGW-U 12 are formed as an integral apparatus, the MME 44 selects, when a plurality of PDN connections are established, an apparatus in which the SGW-C 30 and SGW-U 12 are integrally formed as a common SGW for the plurality of PDN connections. Further, when the communication path for control plane data differs from the communication path for user plane data as shown in FIG. 4, the MME 44 selects the SGW-C 30 as a common SGW-C for a plurality of PDN connections as in the case where the communication path for control plane data is the same as the communication path for user plane data. By having the SGW-C or the PGW-C select the SGW-U that is used when PDN connections are established, when a plurality of PDN connections are established, an SGW-U is selected for each of the PDN connections.

Reference points between components constituting the communication system in FIG. 4 are described hereinafter. A reference point between the UE 50 and the eNB 48 is defined as LTE-Uu. A reference point between the eNB 48 and the MME 44 is defined as S1-MME. A reference point between the MME 44 and the SGW-C 30 is defined as S11. A reference point between the SGW-C 30 and the PGW-C 40 and that between the SGW-C 30 and the PGW-C 41 are defined as S5/S8. A reference point between the PGW-C 40 and the PCRF 42 and that between the PGW-C 41 and the PCRF 43 are defined as Gx. Reference points between the eNB 48 and the SGW-U 12 and that between the eNB 48 and the SGW-U 22 are defined as S1-U. A reference point between the PGW-U 14 and the PDN 1 and that between the PGW-U 24 and the PDN 2 are defined as SGi. A reference point between the MME 44 and the HSS 45 is defined as S6a.

Next, a configuration example of the MME 44 according to the second embodiment of the present disclosure is described with reference to FIG. 5. The MME 44 includes a communication unit 61, a selection unit 62, and a determination unit 63. The communication unit 61 may also be expressed as a transmitter-and-receiver. The communication unit 61, the selection unit 62, and the determination unit 63 may be software or a module(s) by which processes are performed by having a processor execute a program stored in a memory. Alternatively, the communication unit 61, the selection unit 62, and the determination unit 63 may be hardware such as a circuit(s) or a chip(s).

The communication unit 61 communicates with the HSS 45, the eNB 48, the DNS 46, and the SGW-C 30. When the UE 50 establishes a plurality of connections by designating different APNs, the selection unit 62 selects the SGW-C. The selection unit 62 selects the SGW-C 30 that manages an SGW-U associated with a TAI (Tracking Area Identity) related to the UE 50. For example, the selection unit 62 may transmit the TAI related to the UE 50 to the DNS 46 through the communication unit 61 and receive identification information or address information related to the SGW-C 30 that manages the SGW-Us 12 and 22 associated with the TAI related to the UE 50 from the DNS 46.

Further, when the UE 50 establishes a plurality of connections by designating different APNs, the selection unit 62 selects a PGW-C according to the following criteria.

(Criterion 1) A PGW-C that manages a PGW-U associated with an APN designated by the UE 50.

(Criterion 2) A PGW-C that manages a PGW-U that constitutes, together with an SGW-U associated with the TAI related to the UE 50, a gateway apparatus as an integrated apparatus.

For example, assume that the PGW-U 14 is associated with an APN designated by the UE 50 and the SGW-Us 12 and 22 are present as TAIs related to the UE 50. In this case, the SGW-U 12 and the PGW-U 14 constitute the gateway apparatus 10 as an integrated apparatus. Therefore, the selection unit 62 selects the PGW-C 40 that manages the PGW-U 14.

Further, assume that the PGW-U 24 is associated with an APN designated by the UE 50 and the SGW-Us 12 and 22 are present as TAIs related to the UE 50. In this case, the SGW-U 22 and the PGW-U 24 constitute the gateway apparatus 20 as an integrated apparatus. Therefore, the selection unit 62 selects the PGW-C 40 that manages the PGW-U 24.

The selection unit 62 may transmit the TAI related to the UE 50 and the APN designated by the UE 50 to the DNS 46 through the communication unit 61 and receive identification information or address information related to a PGW-C that satisfies the Criteria 1 and 2 from the DNS 46.

Figures 5, 6:
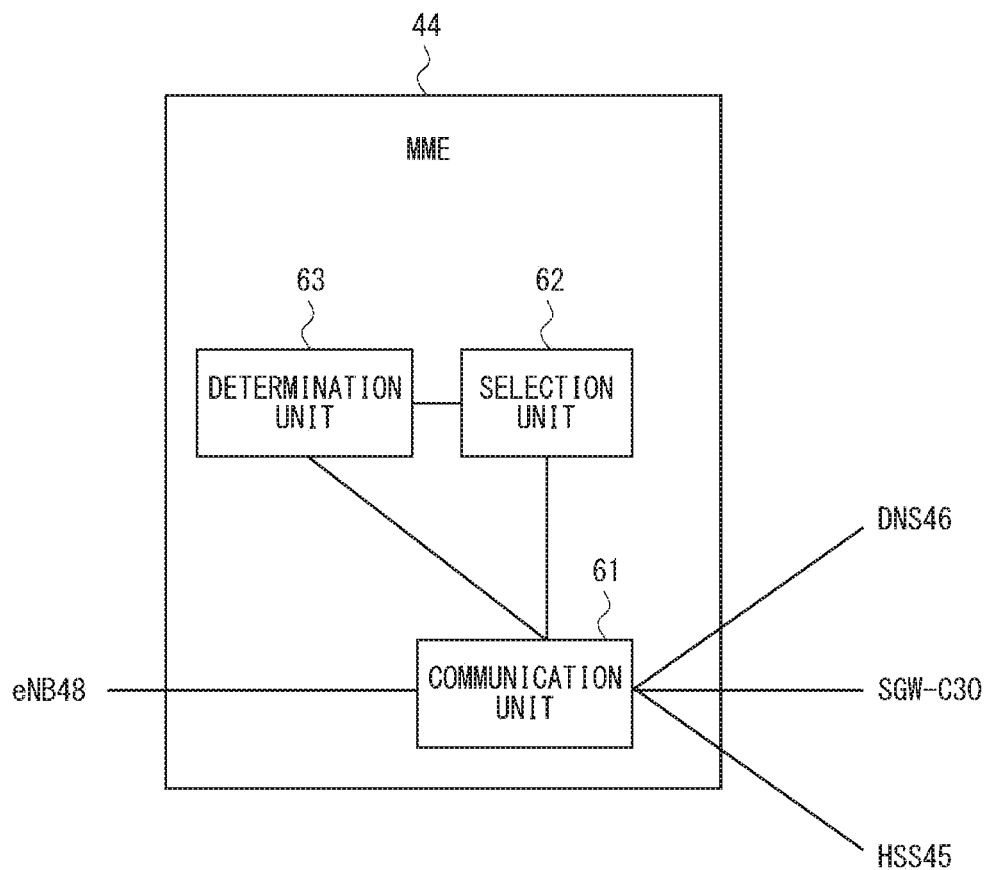
FIG. 5 is a configuration diagram of an MME according to the third embodiment.
FIG. 6 is a table showing information used for selecting an SGW-C/PGW-C apparatus according to the third embodiment.

The DNS 46 may determine whether or not the TAI and the APN transmitted form the MME 44 satisfy the Criteria 1 and 2 in accordance with a table shown in FIG. 6. FIG. 6 indicates that as the DNS 46 is inquired of about PGW-C information based on information on a TAI_1 and an APN_1, the PGW-C 40 is output. Similarly, FIG. 6 indicates that as the DNS 46 is inquired of about PGW-C information based on information on a TAI_1 and an APN_2, the PGW-C 41 is output. Further, regarding the SGW-C, FIG. 6 indicates that as the DNS 46 is inquired of about SGW-C information based on information on the TAI_1, the SGW-C 30 is output. In the node selection using the DNS shown here, when the SGW-C 30 and the PGW-C 40 are selected, it is possible to select the gateway apparatus 10 as a common user plane apparatus by the configuration shown in FIG. 4.

Specifically, the SGW-C 30 and the PGW-C 40 are output from the DNS 46 to the MME 44 in the notation for domain names called FQDN (Fully Qualified Domain Name). The MME 44 can select as a common user plane apparatus by comparing canonical node names indicating parts of the FQDNs of the SGW-C 30 and the PGW-C 40. Specifically, when a canonical node name of the SGW-C 30 matches a canonical node name of the PGW-C 40, or even when the canonical node name of the SGW-C 30 does not match the canonical node name of the PGW-C 40, by using information indicating the configuration shown in FIG. 4 (e.g., information referred to as system configuration information, configuration information, the like), it is possible to select the gateway apparatus 10 as a common user plane apparatus.

Referring to FIG. 5 again, when the selection unit 62 has been able to receive the identification information or the address information related to the PGW-C from the DNS 46, the determination unit 63 determines that there is a gateway apparatus in which an available SGW-U and a PGW-U are formed as an integrated apparatus when a PDN connection related to an APN designated by the UE 50 is established. When the determination unit 63 has determined that the gateway apparatus can be used when the connection is established, it transmits instruction information instructing to use the gateway apparatus in which the SGW-U and the PGW-U are formed as an integrated apparatus to the selected SGW-C 30 through the communication unit 61.

Figure 7:
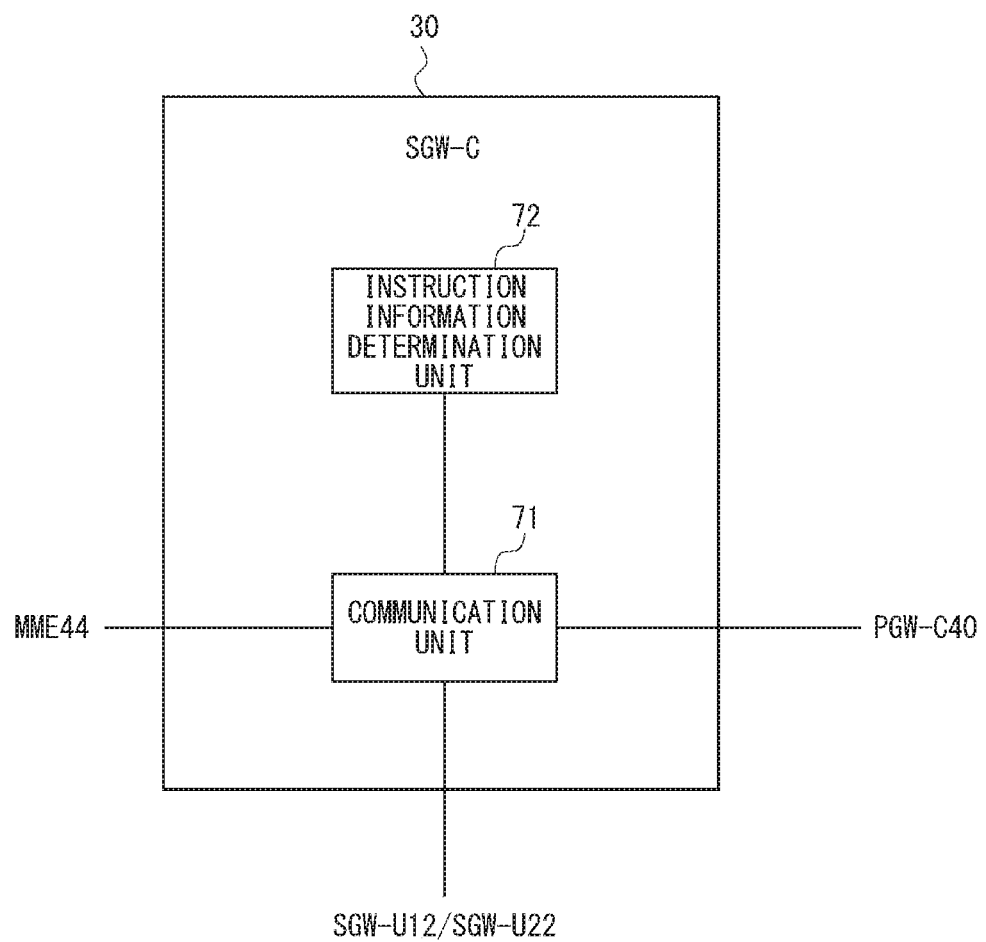
FIG. 7 is a configuration diagram of an SGW-C according to the third embodiment.

Next, a configuration example of the SGW-C 30 according to the second embodiment of the present disclosure is described with reference to FIG. 7. The SGW-C 30 includes a communication unit 71 and an instruction information determination unit 72. The communication unit 71 and the instruction information determination unit 72 may be software or a module(s) by which processes are performed by having a processor execute a program stored in a memory. Alternatively, the communication unit 71 and the instruction information determination unit 72 may be hardware such as a circuit(s) or a chip(s).

The communication unit 71 communicates with the MME 44, the PGW-C 40, the SGW-U 12, and the SGW-U 22. The instruction information determination unit 72 receives instruction information transmitted from the MME 44 through the communication unit 71. The instruction information transmitted from the MME 44 is information instructing to use a gateway apparatus in which the SGW-U and the PGW-U are formed as an integrated apparatus. Upon receiving the instruction information transmitted from the MME 44, the instruction information determination unit 72 transmits the received instruction information to the PGW-C 40 through the communication unit 71.

When the communication unit 71 receives an F-TEID (Fully Qualified-Tunnel Endpoint Identifier) of a PGW-U for an S5/S8 reference point that the PGW-C 40 has selected based on the instruction information from the PGW-C 40, it stores the received F-TEID in a memory or the like. Further, the communication unit 71 transmits the F-TEID of the PGW-U for the S5/S8 reference point selected by the PGW-C 40 to the MME 44. The F-TEID of the PGW-U for the S5/S8 reference point indicates IP address information and a TEID of the PGW-U that are used when the SGW-U communicates with the PGW-U. The TEID is identification information on the PGW-U 14 side of a tunnel set between the PGW-U 14 and the SGW-U 12. In other words, the TEID of the PGW-U 14 is destination information of a transmission destination that is used when the SGW-U 12 transmits user plane data related to the UE 50.

Figure 8:
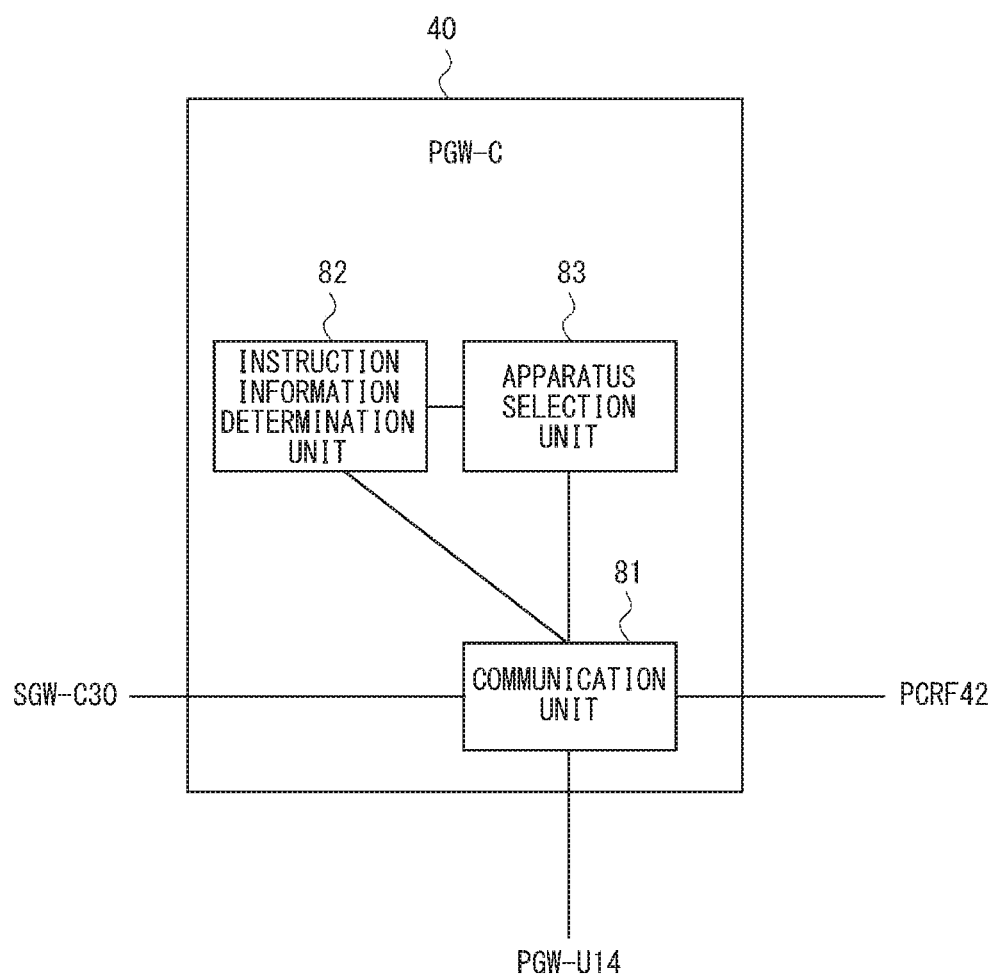
FIG. 8 is a configuration diagram of a PGW-C according to the third embodiment.

Next, a configuration example of the PGW-C 40 according to the second embodiment of the present disclosure is described with reference to FIG. 8. The configuration of the PGW-C 41 is similar to that of the PGW-C 40 and hence a detailed description thereof is omitted. The PGW-C 40 includes a communication unit 81, an instruction information determination unit 82, and an apparatus selection unit 83. The communication unit 81, the instruction information determination unit 82, and the apparatus selection unit 83 may be software or a module(s) by which processes are performed by having a processor execute a program stored in a memory. Alternatively, the communication unit 81, the instruction information determination unit 82, and the apparatus selection unit 83 may be hardware such as a circuit(s) or a chip(s).

The communication unit 81 communicates with the SGW-C 30, the PCRF 42, and the PGW-U 14. The instruction information determination unit 82 receives instruction information transmitted from the SGW-C 30 through the communication unit 81. The instruction information transmitted from the SGW-C 30 is information instructing to use a gateway apparatus in which the SGW-U and the PGW-U are formed as an integrated apparatus. Upon receiving the instruction information transmitted from the SGW-C 30, the instruction information determination unit 82 instructs the apparatus selection unit 83 to select the gateway apparatus.

When the apparatus selection unit 83 is instructed by the instruction information determination unit 82 to select the gateway apparatus, it selects a gateway apparatus composed of the PGW-U associated with the APN designated by the UE 50 and the SGW-U associated with the TAI related to the UE 50.

The apparatus selection unit 83 may select a gateway apparatus by using, for example, information on the system configuration shown in FIG. 4 (hereinafter referred to as configuration information). The apparatus selection unit 83 transmits the F-TEID of the PGW-U included in the selected gateway apparatus to the SGW-C 30 through the communication unit 81.

Figure 9:
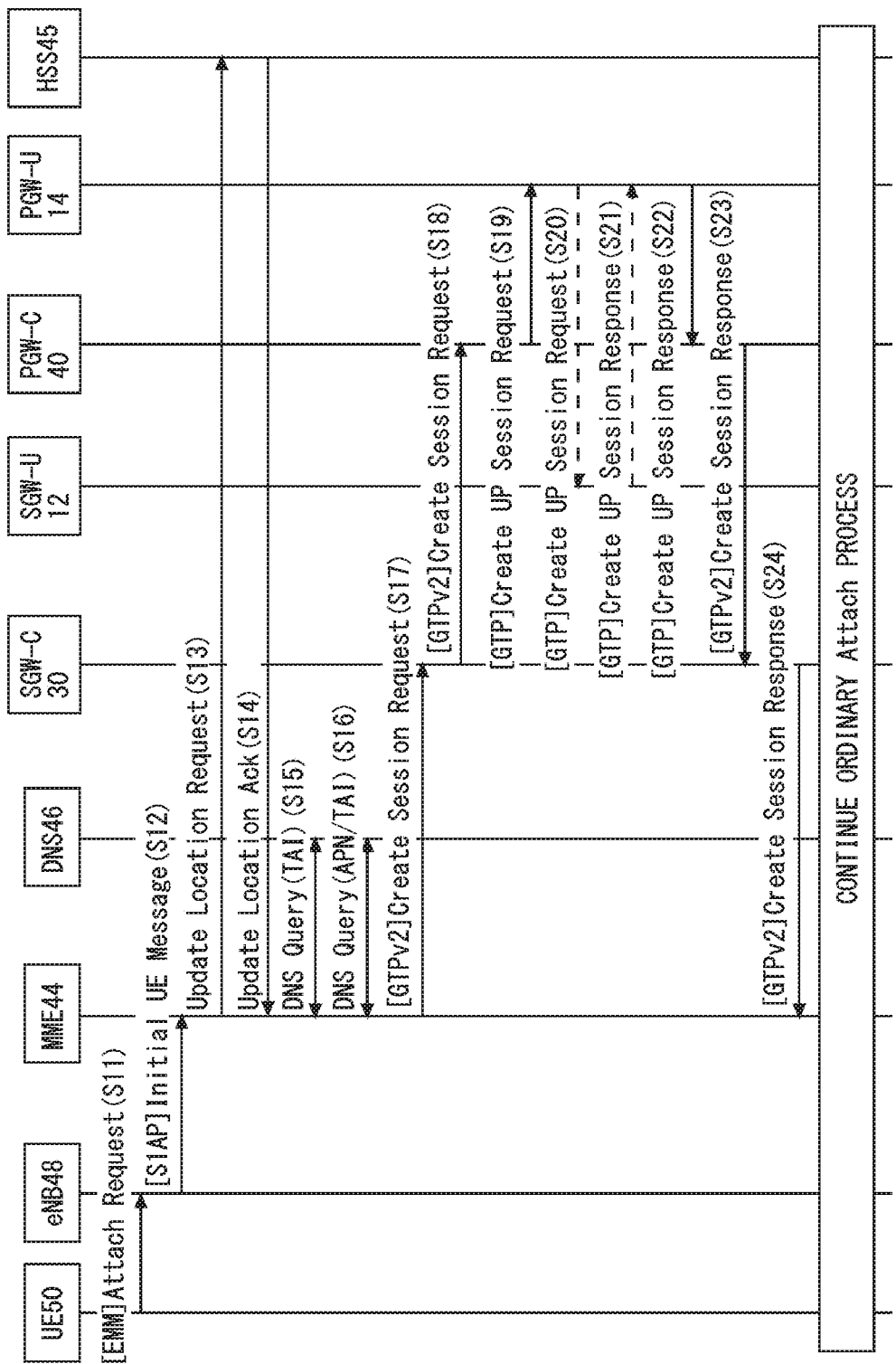
FIG. 9 is a diagram showing a flow of a process for establishing a plurality of PDN connections according to the third embodiment.
Figure 10:
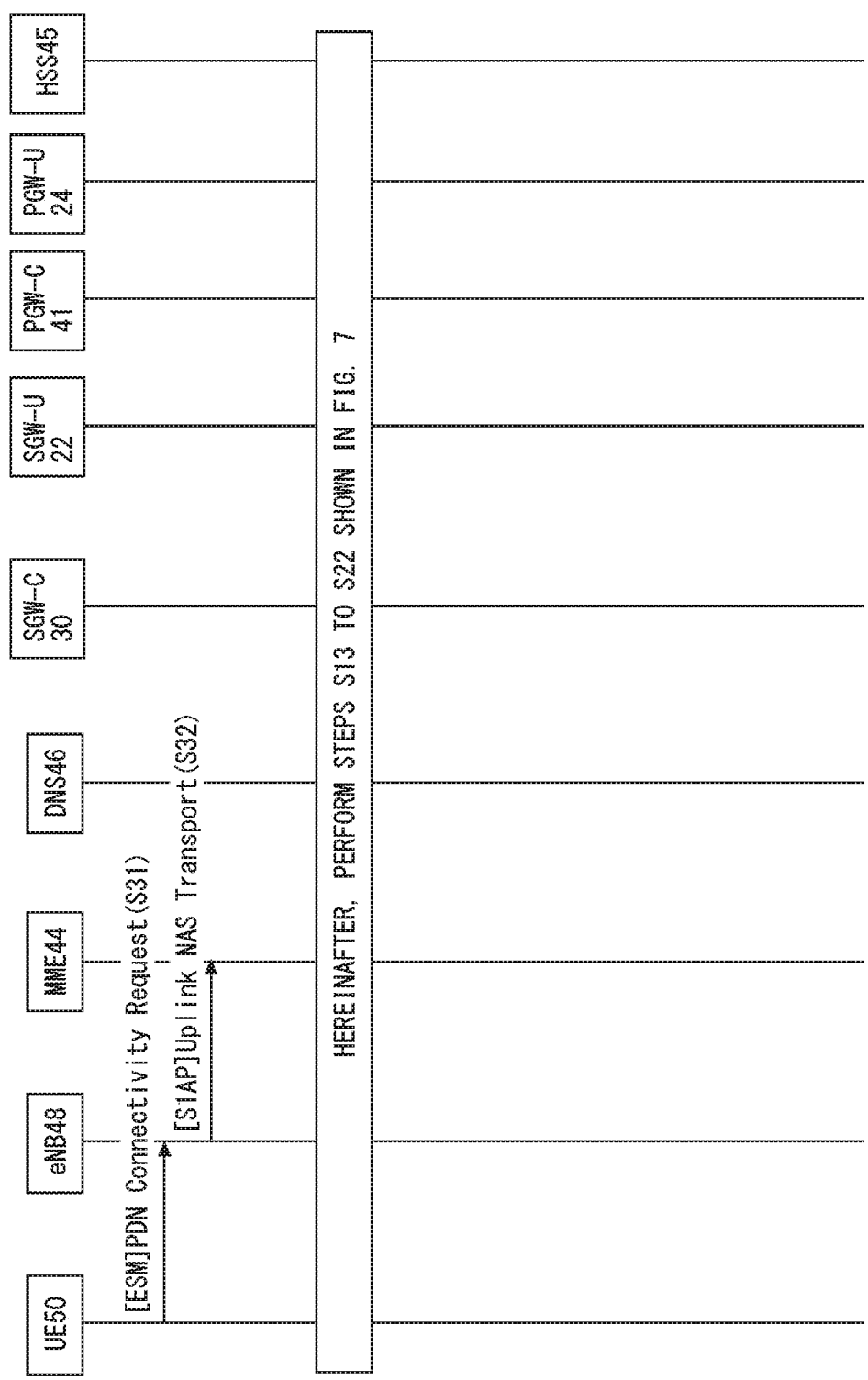
FIG. 10 is a diagram showing a flow of a process for establishing a plurality of PDN connections according to the third embodiment.

Next, a flow of a process for establishing a plurality of PDN connections according to the second embodiment of the present disclosure is described with reference to FIGS. 9 and 10. FIG. 9 shows a first PDN connection establishing process and FIG. 10 shows a second PDN connection establishing process. Further, FIG. 9 indicates that a PDN connection is established in an Attach process for the UE 50. The Attach process is, for example, a process for registering (connecting) the UE 50 in (to) a mobile network that is performed when a power supply of the UE 50 changes from an Off state to an On state.

Firstly, the UE 50 transmits an RRC message including an Attach Request message to the eNB 48 by using an EMM (Evolved Mobility Management) protocol (S11). Next, the eNB 48 transmits an Initial UE Message to the MME 44 by using an S1AP (S1 Application Protocol) (S12). The Initial UE Message includes the Attach Request message that the eNB 48 has received from the UE 50 and TAI information.

The MME 44 transmits an Update Location Request to the HSS 45 (S13). Next, the HSS 45 transmits subscriber data in which APN information is set to the MME 44 (S14).

Next, the MME 44 transmits a DNS Query message designating a TAI for identifying a TA to which the eNB 48 belongs to the DNS 46 (S15). For example, the MME 44 sets a TAI_1 in the DNS Query message. After transmitting the DNS Query message in the step S15, the MME 44 receives a response message in which an SGW-C 30 associated with the designated TAI_1 is set from the DNS 46. The SGW-C 30 manages the SGW-Us 12 and 22 associated with the TAI_1.

Next, the MME 44 transmits a DNS Query message designating the TAI_1 and an APN_1 indicating an APN of a connection destination to the DNS 46 (S16). After transmitting the DNS Query message in the step S16, the MME 44 receives information indicating that there is a gateway apparatus in which an SGW-U associated with the TAI_1 and a PGW-U associated with the APN_1 are integrally configured from the DNS 46. For example, when the MME 44 receives a response message in which the PGW-C 40 managing the PGW-U included in the gateway apparatus is set, it may determine that there is a gateway apparatus in which the SGW-U associated with the TAI_1 and the PGW-U associated with the APN_1 are integrally configured. In other words, when there is no gateway apparatus in which the SGW-U associated with the designated TAI and the PGW-U associated with the designated APN are integrally configured, the DNS 46 does not transmit the response message in which the PGW-C is set to the MME 44.

Next, the MME 44 transmits a Create Session Request message in which a Collocated flag indicating that the SGW-U and the PGW-U can be integrally configured (Collocation) is set together with the TAI_1 and the APN_1 to the SGW-C 30 (S17). The MME 44 transmits the Create Session Request message to the SGW-C 30 by using GTPv2 (General Packet Radio Service Tunneling Protocol version 2).

Next, when the Collocated flag is set in the Create Session Request message transmitted from the MME 44, the SGW-C 30 transmits the received Create Session Request message to the PGW-C 40 without selecting an SGW-U that communicates with the eNB 48 (S18). The PGW-C 40 selects the user plane gateway apparatus 10 (the SGW-U and the PGW-U) according to the Collocated flag set in the Create Session Request message.

For example, the PGW-C 40 selects the gateway apparatus 10 in which the SGW-U 12 associated with the TAI_1 and the PGW-U 14 associated with the APN_1 are integrally configured by using the configuration information shown in FIG. 4.

Next, when the PGW-C 40 selects the gateway apparatus 10, it transmits a Create UP Session Request message to the PGW-U 14 included in the gateway apparatus 10 (S19). The PGW-C 40 sets an S1-U IP address which is an IP address of the eNB 48, a TEID of the eNB 48, and an S5S8-U IP address in the Create UP Session Request message. Further, the PGW-C 40 may set a TEID set in the PGW-C 40, QoS information related to the UE 50, and the like in the Create UP Session Request message.

Next, the PGW-U 14 transmits the Create UP Session Request message received from the PGW-C 40 to the SGW-U 12 (S20). Next, in response to the Create UP Session Request message, the SGW-U 12 transmits a Create UP Session Response message to the PGW-U 14 (S21). Note that the SGW-U 12 and the PGW-U 14 are formed as an integrated apparatus in the gateway apparatus 10. Therefore, the transmission of the Create UP Session Request message and the Create UP Session Response message between the SGW-U 12 and the PGW-U 14 is not performed as transmission of packet data, but is performed as internal processes in the apparatus. Arrows indicated by broken lines in the steps S20 and S21 indicate that they are performed as internal processes in the apparatus. In this way, a tunnel can be formed between the SGW-U 12 and the PGW-U 14.

Next, the PGW-U 14 transmits the Create UP Session Response message to the PGW-C 40 as a response message to the Create UP Session Request message transmitted in the step S19 (S22). Next, the PGW-C 40 transmits the Create Session Response message to the SGW-C 30 as a response message to the Create Session Request message transmitted in the step S18 (S23). The Create Session Response message includes the Collocated flag and the F-TEIDs of the SGW-U 12 and the PGW-U 14 included in the gateway apparatus 10 selected by the PGW-C 40. Note that a protocol other than the GTP protocol may be used for the above-described Create UP Session Request message and the Create UP Session Response message.

Next, the SGW-C 30 transmits a Create Session Response message in which the F-TEID of the SGW-U 12 is set to the MME 44 (S24). An Attach process performed in the step S24 and subsequent steps is similar to an Attach process specified in Non-patent Literature 1 and hence a detailed description thereof is omitted. By performing the Attach process shown in FIG. 9, a PDN connection is established between the UE 50 and the PGW-U 14.

Next, a flow of a second PDN connection establishing process is described with reference to FIG. 10. Firstly, the UE 50 transmits an RRC message including a PDN Connectivity Request message to the eNB 48 by using an ESM (Evolved Session Management) protocol (S31). An APN is set in the PDN Connectivity Request message. Next, the eNB 48 transmits an Uplink NAS (Non Access Stratum) Transport message including the PDN Connectivity Request message to the MME 44 by using an S1AP (S32). The Uplink NAS Transport includes the PDN Connectivity Request message that the eNB 48 has received from the UE 50. After that, processes similar to those in the steps S13 to S24 shown in FIG. 9 are performed. When the steps S13 to S24 shown in FIG. 9 are performed in the second PDN connection establishing process, a TAI_1 and an APN_2 shown in FIG. 4 are used as parameters set in the Create Session Request message. Therefore, the PGW-C 41 selects the user plane gateway apparatus 20 (the SGW-U and the PGW-U). In this way, when the processes shown in FIG. 10 are completed, a PDN connection is established between the UE 50 and the PGW-U 24. As a result, the first PDN connection is established between the UE 50 and the gateway apparatus 10, and the second PDN connection is established between the UE 50 and the gateway apparatus 20. Note that when PDN connections for three or more APNs are established, they can be established by repeating processes similar to those shown in FIG. 10.

As described above, in the third embodiment according to the present disclosure, the SGW is separated into a SGW-C and a SGW-U, and the PGW is separated into a PGW-C and a PGW-U. By doing so, a communication path for control plane data and a communication path for user plane data are separated from each other. Further, in the third embodiment according to the present disclosure, a gateway apparatus in which an SGW-U and a PGW-U both of which transmit/receive user plane data are integrally configured is used. When a plurality of PDN connections are established, the PGW-C selects a gateway apparatus used for a respective one of the PDN connections. By doing so, it is possible to perform transmission of messages between the SGW-U and the PGW-U as internal processes in the gateway apparatus.

Further, in FIG. 9, although the MME 44 sets the TAI_1 in the DNS Query message and transmits the DNS Query message in the step S16, it may set only the APN designated by the UE 50 without setting the TAI_1. In such a case, the DNS 46 transmits a response message in which the PGW-C associated only with the APN is set to the MME 44. The MME 44 receives the response message in which the PGW-C is set. However, depending on the configuration, the MME 44 may be able to determine whether there is a gateway apparatus in which the SGW-U and the PGW-U are integrally configured.

Further, even when the MME 44 cannot determine whether there is a gateway apparatus in which the SGW-U and the PGW-U are integrally configured, the MME 44 transmits the Create Session Request message in which the Collocated flag is set to the SGW-C 30. That is, when the MME 44 sets only the APN in the DNS Query message without setting the TAI and transmits the DNS Query message to the DNS 46, the MME 44 transmits the Create Session Request message in which the Collocated flag is set to the SGW-C 30 without determining whether or not there is the gateway apparatus. The SGW-C 30 transmits the received Create Session Request message to the PGW-C 40. When there is a gateway apparatus in which the SGW-U and the PGW-U associated with the APN and the TAI included in the Create Session Request message are integrally configured, the PGW-C 40 performs processes similar to those in the step S19 and subsequent steps shown in FIG. 9. For example, the PGW-C 40 may determine whether or not there is a gateway apparatus in which the SGW-U and the PGW-U associated with the APN and the TAI included in the Create Session Request message are integrally configured by using the configuration information shown in FIG. 4. When there is no gateway apparatus in which the SGW-U and the PGW-U associated with the APN and the TAI included in the Create Session Request message are integrally configured, the PGW-C 40 may transmit an error message to the SGW-C 30.

Fourth Embodiment

Figure 11:
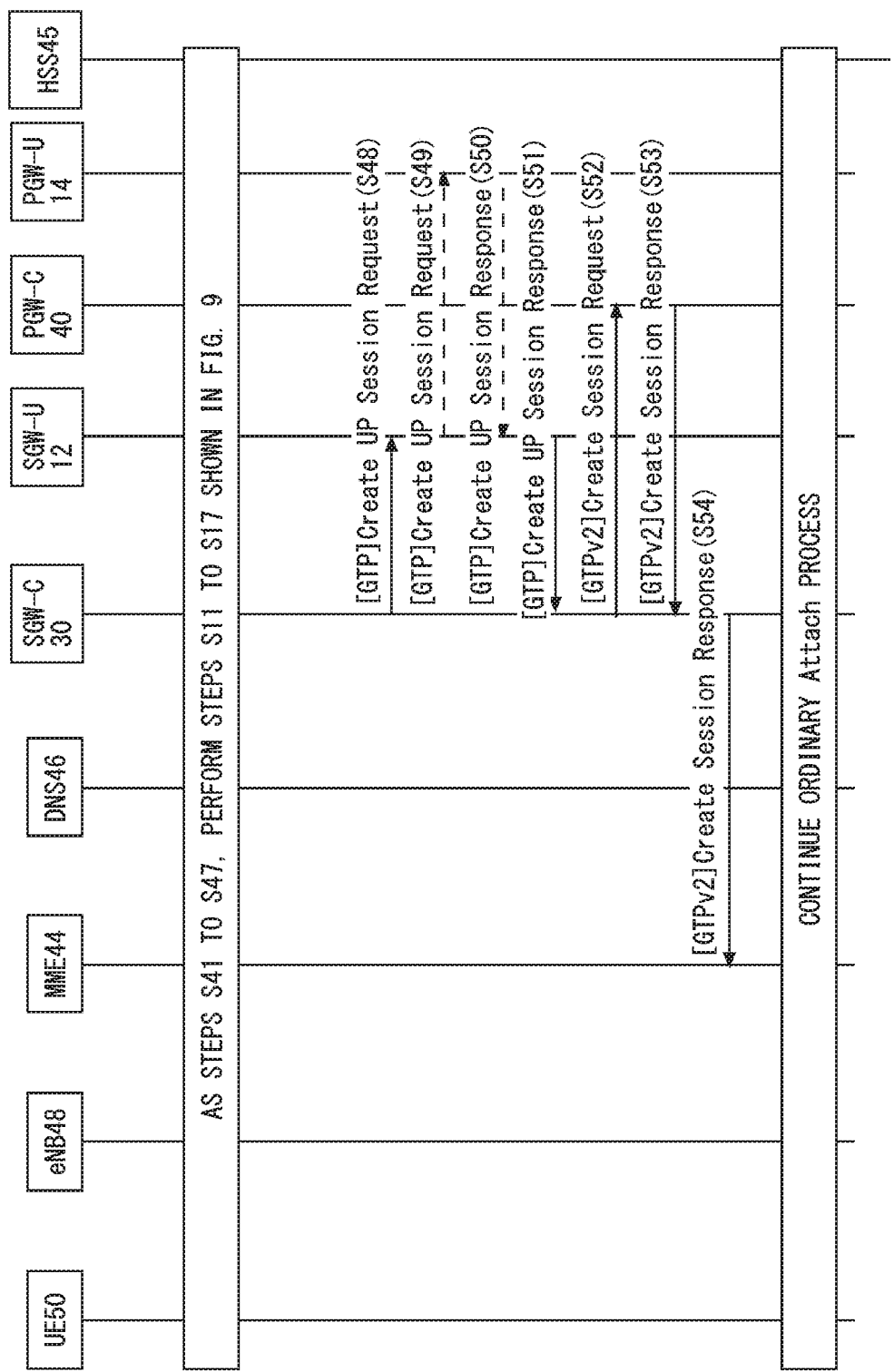
FIG. 11 is a diagram showing a flow of a process for establishing a plurality of PDN connections according to a fourth embodiment.

Next, a flow of an Attach process that is performed when a process for establishing a plurality of PDN connections according to a third embodiment is performed is described with reference to FIG. 11. Steps S41 to S47 in FIG. 11 are similar to the steps S11 to S17 in FIG. 9, and hence detailed descriptions thereof are omitted.

When a Collocated flag is set in a Create Session Request message transmitted from the MME 44 in the step S47, the SGW-C 30 selects a gateway apparatus that transmits/receives user plane data by using the TAI and APN information and the like included in the Create Session Request message. A fourth embodiment is different from the third embodiment in that while the SGW-C 30 selects a gateway apparatus in the fourth embodiment, the PGW-C 40 selects a gateway apparatus in the third embodiment.

For example, the SGW-C 30 selects the gateway apparatus 10 in which the SGW-U 12 associated with the TAI_1 and the PGW-U 14 associated with the APN_1 are integrally configured by using the configuration information shown in FIG. 4.

Next, when the SGW-C 30 selects the gateway apparatus 10, it transmits a Create UP Session Request message to the SGW-U 12 included in the gateway apparatus 10 (S48). The SGW-C 30 sets an S1-U IP address which is an IP address of the eNB 48, a TEID of the eNB 48, and an S5S8-U IP address in the Create UP Session Request message. Further, the SGW-C 30 may set a TEID set in the SGW-C 30, QoS information related to the UE 50, and the like in the Create UP Session Request message.

Next, the SGW-U 12 transmits the Create UP Session Request message received from the SGW-C 30 to the PGW-U 14 (S49). Next, in response to the Create UP Session Request message, the PGW-U 14 transmits a Create UP Session Response message to the SGW-U 12 (S50). Note that the SGW-U 12 and the PGW-U 14 are formed as an integrated apparatus in the gateway apparatus 10. Therefore, the transmission of the Create UP Session Request message and the Create UP Session Response message between the SGW-U 12 and the PGW-U 14 is not performed as transmission of packet data, but is performed as internal processes in the apparatus. Arrows indicated by broken lines in the steps S49 and S50 indicate that they are performed as internal processes in the apparatus. In this way, a tunnel can be formed between the SGW-U 12 and the PGW-U 14.

Next, the SGW-U 12 transmits a Create UP Session Response message including SGW-U information (F-TEID) and PGW-U information (F-TEID) to the SGW-C 30 as a response message to the Create UP Session Request message transmitted in the step S48 (S51). Next, the SGW-C 30 transmits a Create Session Request message to the PGW-C 40 by using a GTPv2 protocol (S52). The Create Session Request message includes a Collocated flag and the PGW-U information (F-TEID) of the PGW-U 14 included in the selected gateway apparatus 10. Next, the PGW-C 40 transmits a Create Session Response message to the SGW-C 30 (S53). The Create Session Response message includes the Collocated flag and the F-TEID of the PGW-U 14. Note that a protocol other than the GTP protocol may be used for the above-described Create UP Session Request message and the Create UP Session Response message.

Next, the SGW-C 30 transmits a Create Session Response message to the MME 44 as a response message to the Create Session Request message transmitted in the step S47 (S54). An Attach process in the step S54 and subsequent steps is similar to an Attach process specified in Non-patent Literature 1 and hence a detailed description thereof is omitted.

Further, a second PDN connection establishing process is similar to that shown in FIG. 10. Further, in a step S32 and subsequent steps in FIG. 10, processes similar to those in the steps S43 to S54 in FIG. 11 are performed. When the steps S43 to S54 shown in FIG. 11 are performed in the second PDN connection establishing process, a TAI_1 and an APN_2 shown in FIG. 6 are used as parameters set in the Create Session Request message. Therefore, the SGW-C 30 selects the gateway apparatus 20.

As described above, in the third embodiment according to the present disclosure, the SGW is separated into a SGW-C and a SGW-U, and the PGW is separated into a PGW-C and a PGW-U. By doing so, a communication path for control plane data and a communication path for user plane data are separated from each other. Further, in the third embodiment according to the present disclosure, a gateway apparatus in which an SGW-U and a PGW-U are integrally configured is used. When a plurality of PDN connections are established, the SGW-C selects a gateway apparatus used for a respective one of the PDN connections. By doing so, it is possible to perform transmission of messages between the SGW-U and the PGW-U as internal processes in the gateway apparatus.

Further, in FIG. 11, although the MME 44 sets the TAI_1 in the DNS Query message and transmits the DNS Query message in the step S46, it may set only the APN designated by the UE 50 without setting the TAI_1. In such a case, the DNS 46 transmits a response message in which the PGW-C associated only with the APN is set to the MME 44. The MME 44 receives the response message in which the PGW-C is set. However, depending on the configuration, the MME 44 may be able to determine whether there is a gateway apparatus in which the SGW-U and the PGW-U are integrally configured.

Further, even when the MME 44 cannot determine whether there is a gateway apparatus in which the SGW-U and the PGW-U are integrally configured, the MME 44 transmits the Create Session Request message in which the Collocated flag is set to the SGW-C 30. That is, when the MME 44 sets only the APN in the DNS Query message without setting the TAI and transmits the DNS Query message to the DNS 46, the MME 44 transmits the Create Session Request message in which the Collocated flag is set to the SGW-C 30 without determining whether or not there is the gateway apparatus. When there is a gateway apparatus in which the SGW-U and the PGW-U associated with the APN and the TAI included in the Create Session Request message are integrally configured, the SGW-C 30 performs processes similar to those in the step S48 and subsequent steps shown in FIG. 11. For example, the SGW-C 30 may determine whether or not there is a gateway apparatus in which the SGW-U and the PGW-U associated with the APN and the TAI included in the Create Session Request message are integrally configured by using the configuration information shown in FIG. 4. When there is no gateway apparatus in which the SGW-U and the PGW-U associated with the APN and the TAI included in the Create Session Request message are integrally configured, the SGW-C 30 may transmit an error message to the MME 44.

Fifth Embodiment

Figure 12:
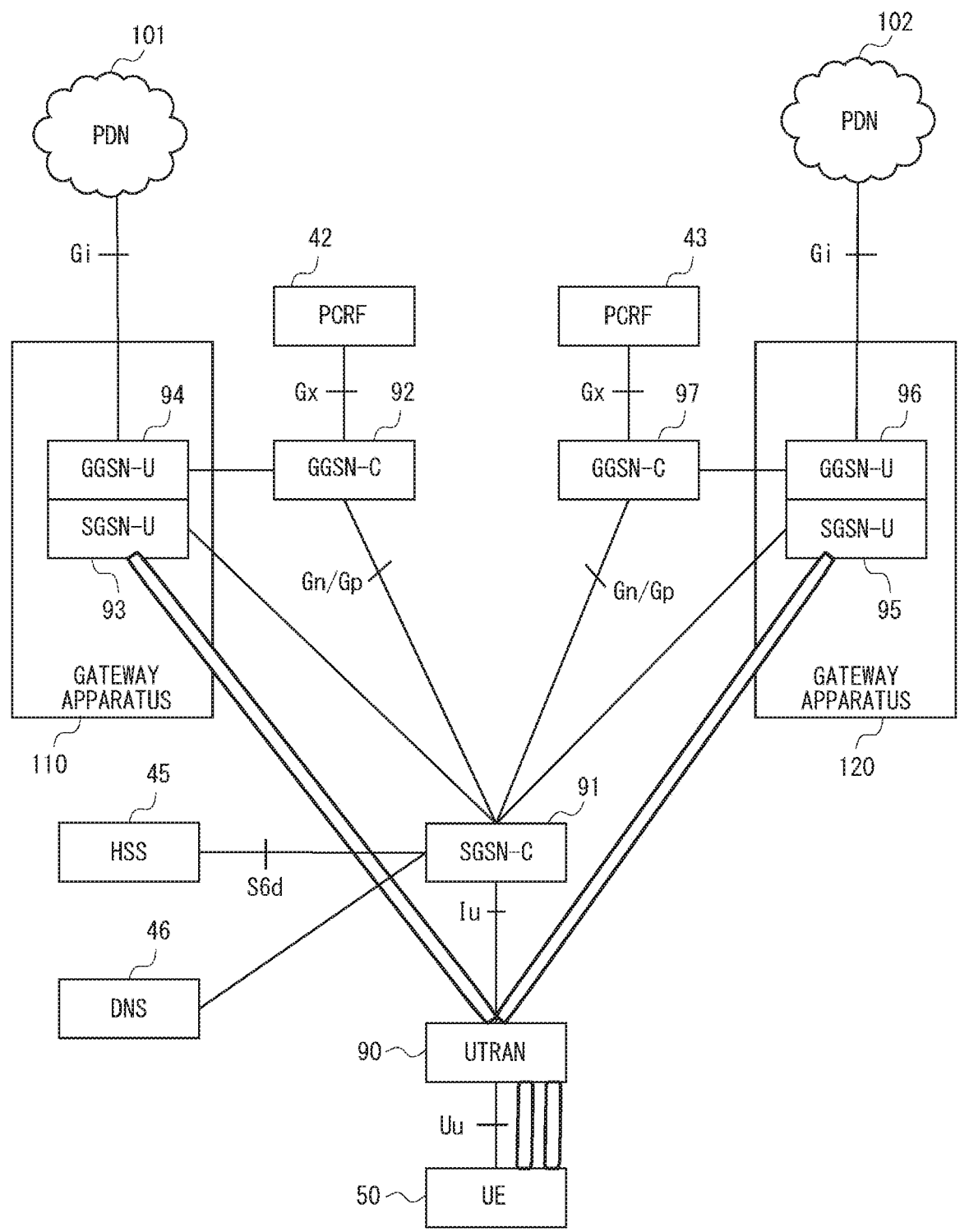
FIG. 12 is a configuration diagram of a communication system according to a fifth embodiment.

Next, a configuration example of a communication system according to a fourth embodiment of the present disclosure is described with reference to FIG. 12. In FIG. 12, the same symbols as those in FIG. 4 are assigned to the same apparatuses as those in FIG. 4. Further, detailed descriptions of the same apparatuses as those in FIG. 4 are omitted.

A communication system shown in FIG. 10 includes an HSS 45, a UE 50, a UTRAN (Universal Terrestrial Radio Network) 90, a DNS 46, a PCRF 42, a PCRF 43, an SGSN-C(Serving GPRS Support Node-C) 91, a GGSN-C (Gateway GPRS Support Node-C) 92, a GGSN-C 97, a gateway apparatus 110, a gateway apparatus 120, a PDN 101, and a PDN 102.

The UTRAN 90 is a network including a base station corresponding to the base station 34 shown in FIG. 3. The UTRAN 90 is a network including a base station specified in the 3GPP, and is a network including a base station that supports a radio communication method defined as 3G.

The SGSN-C 91 corresponds to the SGW-C 30 and the MME 44 shown in FIG. 4, and the GGSN-C 92 corresponds to the PGW-C 40 shown in FIG. 4. Further, the GGSN-C 97 corresponds to the PGW-C 41 shown in FIG. 4.

The gateway apparatus 110 includes an SGSN-U 93 and a GGSN-U 94, and the SGSN-U 93 and the GGSN-U 94 are formed as an integrated apparatus (Collocated Gateway). Further, the gateway apparatus 120 includes an SGSN-U 95 and a GGSN-U 96, and the SGSN-U 95 and the GGSN-U 96 are formed as an integrated apparatus. In other words, the SGSN-U 93 and the GGSN-U 94 are co-located, and the SGSN-U 95 and the GGSN-U 96 are co-located.

The SGSN-U 93 corresponds to the SGW-U 12 shown in FIG. 4, and the GGSN-U 94 corresponds to the PGW-U 14 shown in FIG. 4. Further, the SGSN-U 95 corresponds to the SGW-U 22 in FIG. 4, and the GGSN-U 96 corresponds to the PGW-U 24 in FIG. 4.

While the SGSN-C 91, the GGSN-C 92, and the GGSN-C 97 transmit control plane data related to the UE 50, the SGSN-U 93 and the GGSN-U 94, and the SGSN-U 95 and the GGSN-U 96 transmit user plane data related to the UE 50. That is, in the communication system shown in FIG. 12, a communication path for control plane data related to the UE 50 is different from a communication path for user plane data related to the UE 50.

In response to a request from the SGSN-C 91, the DNS 46 transmits identification information or address information of the GGSN-C 92 or the GGSN-C 97 to the SGSN-C 91. The address information may include IP address information.

By using the communication system shown in FIG. 12, the UE 50 can simultaneously establish a PDN connection with the PDN 102 as well as with the PDN 101. Further, when the UE 50 establishes a plurality of PDN connections, the SGSN-C 91 is used as the SGSN-C that manages the SGSN-U. Further, the SGSN-Us 93 and 95 are used as the SGSN-U that establishes a PDN connection.

That is, when the UTRAN 90 establishes a plurality of PDN connections, it selects the SGSN-C 91 as a common SGSN-C.

Reference points between components constituting the communication system in FIG. 12 are described hereinafter. A reference point between the UE 50 and the UTRAN 90 is defined as Uu. A reference point between the UTRAN 90 and the SGSN-C 91 is defined as Iu. A reference point between the SGSN-C 91 and the GGSN-C 92 and that between the SGSN-C 91 and the GGSN-C 97 is defined as Gn/Gp. A reference point between the GGSN-C 92 and the PCRF 42 and that between the GGSN-C 97 and the PCRF 43 is defined as Gx. A reference point between the GGSN-U 94 and the PDN 1 and that between the GGSN-U 96 and PDN 2 is defined as Gi.

Figure 13:
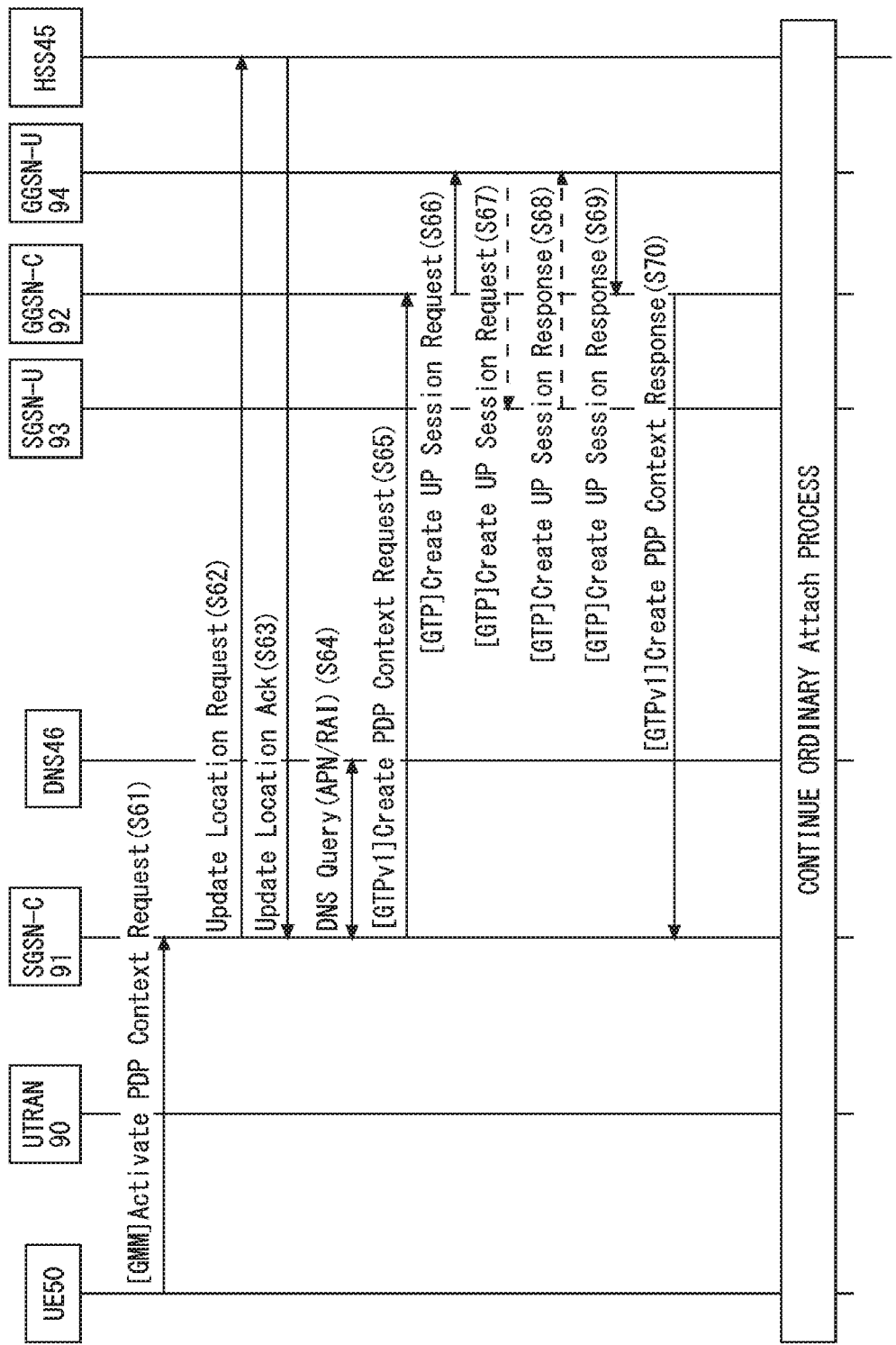
FIG. 13 is a diagram showing a flow of a process for establishing a plurality of PDN connections according to a fifth embodiment.

Next, a flow of process for establishing a plurality of PDN connections according to the fourth embodiment of the present disclosure is described with reference to FIG. 13. FIG. 13 shows a first PDN connection establishing process. Further, a second PDN connection establishing process is similar to that shown in FIG. 13. That is, when two PDN connections are established, the process shown in FIG. 13 is repeated twice.

Firstly, the UE 50 transmits an Activate PDP Context Request message to the SGSN-C 91 by using a GMM (GPRS Mobility Management) protocol (S61).

The SGSN-C 91 transmits an Update Location Request to the HSS 45 (S62). Next, the HSS 45 transmits subscriber data in which APN information is set to the SGSN-C 91 (S63).

Next, the SGSN-C 91 transmits a DNS Query message designating an RAI (Routing Area Identity) for identifying an RA (Routing Area) to which the UTRAN 90 belongs and an APN to which the UE 50 will connect to the DNS 46 (S64). After transmitting the DNS Query message in the step S64, the SGSN-C 91 receives information indicating that there is a gateway apparatus in which an SGSN-U associated with the RAI and a GGSN-U associated with the APN are integrally configured from the DNS 46. For example, when the SGSN-C 91 receives a response message in which the GGSN-C managing the GGSN-U included in the gateway apparatus is set, it may determine that there is a gateway apparatus in which the SGSN-U associated with the RAI and the GGSN-U associated with the APN are integrally configured. In other words, when there is no gateway apparatus in which the SGSN-U associated with the designated RAI and the GGSN-U associated with the designated APN are integrally configured, the DNS 46 does not transmit the response message in which the GGSN-C is set to the SGSN-C 91.

Next, when the SGSN-C 91 determines that there is the gateway apparatus, it transmits a Create PDP Context Request message in which a Collocated flag indicating that the SGSN-U and the GGSN-U can be integrally configured (Collocation) is set together with the RAI and the APN to the GGSN-C 92 without selecting the SGSN-U (S65). The SGSN-C 91 transmits the Create PDP Context Request message to the GGSN-C 92 by using GTPv1 (General Packet Radio Service Tunneling Protocol version 1).

The GGSN-C 92 selects the user plane gateway apparatus 110 (the SGSN-U and the GGSN-U) according to the Collocated flag set in the Create PDP Context Request message by using the RAI and APN information and the like included in the Create PDP Context Request message.

Next, when the GGSN-C 92 selects the gateway apparatus 110, it transmits a Create UP Session Request message to the GGSN-U 94 included in the gateway apparatus 110 (S66).

Next, the GGSN-U 94 transmits the Create UP Session Request message received from the GGSN-C 92 to the SGSN-U 93 (S67). Next, in response to the Create UP Session Request message, the SGSN-U 93 transmits a Create UP Session Response message to the GGSN-U 94 (S68). Note that the SGSN-U 93 and the GGSN-U 94 are formed as an integrated apparatus in the gateway apparatus 110. Therefore, the transmission of the Create UP Session Request message and the Create UP Session Response message between the SGSN-U 93 and the GGSN-U 94 is not performed as transmission of packet data, but is performed as internal processes in the apparatus. Arrows indicated by broken lines in the steps S67 and S68 indicate that they are performed as internal processes in the apparatus. In this way, a tunnel can be formed between the SGSN-U 93 and the GGSN-U 94.

Next, the GGSN-U 94 transmits a Create UP Session Response message to the GGSN-C 92 as a response message to the Create UP Session Request message transmitted in the step S66 (S69). Note that a protocol other than the GTP protocol may be used for the above-described Create UP Session Request message and the Create UP Session Response message.

Next, the GGSN-C 92 transmits a Create PDP Context Response message to the SGSN-C 91 as a response message to the Create PDP Context Request message transmitted in the step S65 (S70).

An Attach process in the step S70 and subsequent steps is similar to an Attach process specified in Non-patent Literature 1 and hence a detailed description thereof is omitted.

Further, in FIG. 13, although the SGSN-C 91 sets the RAI in the DNS Query message and transmits the DNS Query message in the step S64, it may set only the APN designated by the UE 50 without setting the RAI. In such a case, the DNS 46 transmits a response message in which the GGSN-C 92 associated only with the APN is set to the SGSN-C 91. The SGSN-C 91 receives the response message in which the GGSN-C 92 is set. However, depending on the configuration, the SGSN-C 91 may be able to determine whether there is a gateway apparatus in which the SGSN-U and the GGSN-U are integrally configured.

Further, even when the SGSN-C 91 cannot determine whether there is a gateway apparatus in which the SGSN-U and the GGSN-U are integrally configured, the SGSN-C 91 transmits the Create PDP Context Request message in which the Collocated flag is set to the GGSN-C 92. That is, when the SGSN-C 91 sets only the APN in the DNS Query message without setting the RAI and transmits the DNS Query message to the DNS 46, the SGSN-C 91 transmits the Create PDP Context Request message in which the Collocated flag is set to the GGSN-C 92 without determining whether or not there is the gateway apparatus. The SGSN-C 91 transmits the received Create PDP Context Request message to the GGSN-C 92. When there is a gateway apparatus in which the SGSN-U and the GGSN-U associated with the APN and the RAI included in the Create PDP Context Request message are integrally configured, the GGSN-C 92 performs processes similar to those in the step S66 and subsequent steps shown in FIG. 13. For example, the GGSN-C 92 may determine whether or not there is a gateway apparatus in which the SGSN-U and the GGSN-U associated with the APN and the RAI included in the Create PDP Context Request message are integrally configured by using the configuration information shown in FIG. 12. When there is no gateway apparatus in which the SGSN-U and the GGSN-U associated with the APN and the RAI included in the Create PDP Context Request message are integrally configured, the GGSN-C 92 may transmit an error message to the SGSN-C 91.

Sixth Embodiment

Figure 14:
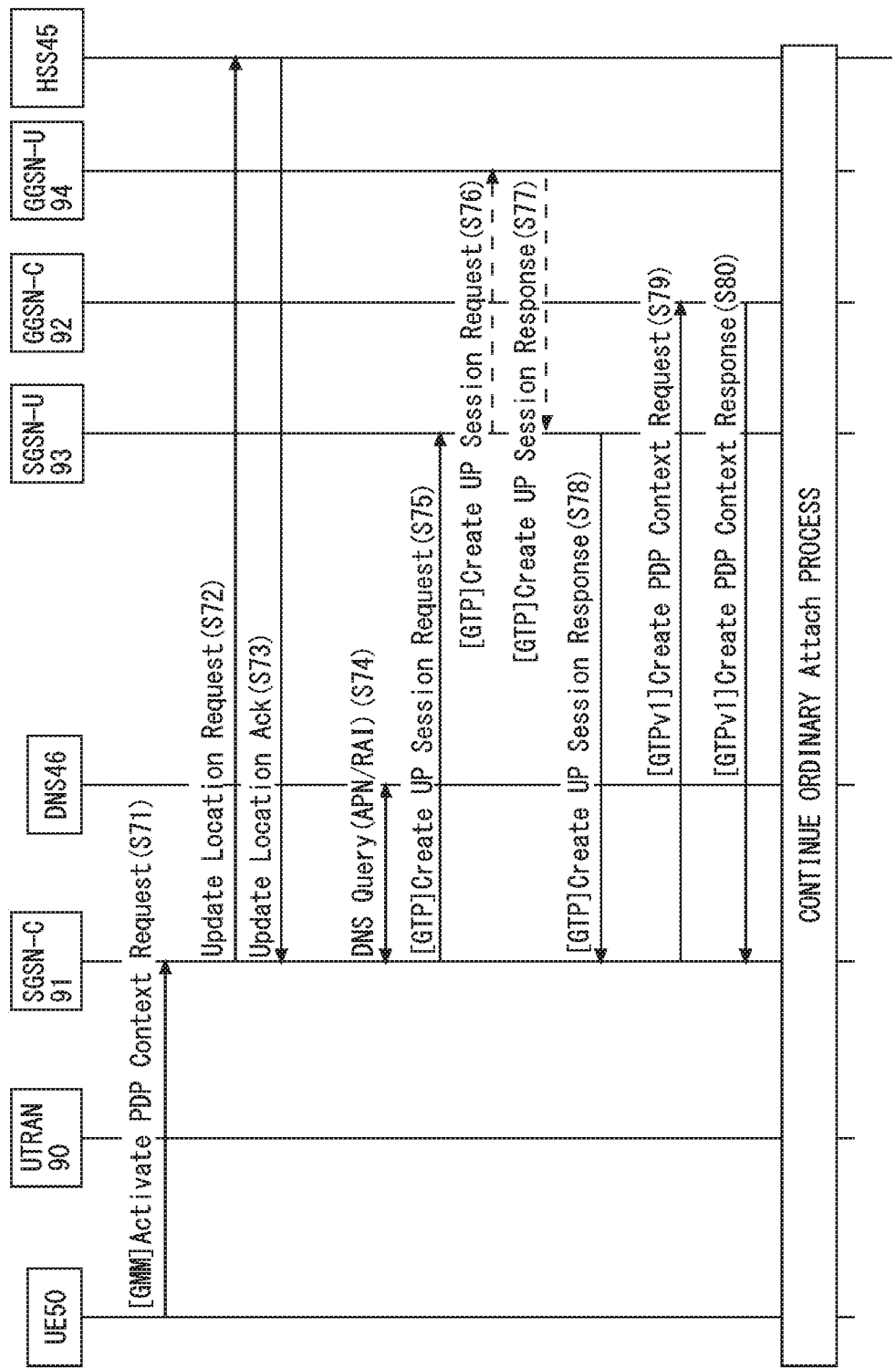
FIG. 14 is a diagram showing a flow of a process for establishing a plurality of PDN connections according to a sixth embodiment.

Next, a flow of process for establishing a plurality of PDN connections according to a fifth embodiment of the present disclosure is described with reference to FIG. 14. FIG. 14 shows a first PDN connection establishing process. Further, a second PDN connection establishing process is similar to that shown in FIG. 14. That is, when two PDN connections are established, the process shown in FIG. 14 is repeated twice.

Steps S71 to S74 are similar to the steps S61 to S64 in FIG. 13, and hence detailed descriptions thereof are omitted.

Next, when the SGSN-C 91 determines that there is a gateway apparatus, it selects the gateway apparatus. Upon selecting the gateway apparatus 110, the SGSN-C 91 transmits a Create UP Session Request message to the SGSN-U 93 included in the gateway apparatus 110 (S75). The sixth embodiment is different from the fifth embodiment in that while the SGSN-C 91 selects the gateway apparatus in the sixth embodiment, the GGSN-C 92 selects the gateway apparatus in the fifth embodiment.

Next, the SGSN-U 93 transmits the Create UP Session Request message received from the SGSN-C 91 to the GGSN-U 94 (S76). Next, in response to the Create UP Session Request message, the GGSN-U 94 transmits a Create UP Session Response message to the SGSN-U 93 (S77). Note that the SGSN-U 93 and the GGSN-U 94 are formed as an integrated apparatus in the gateway apparatus 110. Therefore, the transmission of the Create UP Session Request message and the Create UP Session Response message between the SGSN-U 93 and the GGSN-U 94 is not performed as transmission of packet data, but is performed as internal processes in the apparatus. Arrows indicated by broken lines in the steps S76 and S77 indicate that they are performed as internal processes in the apparatus. In this way, a tunnel can be formed between the SGSN-U 93 and the GGSN-U 94.

Next, the SGSN-U 93 transmits a Create UP Session Response message including SGSN-U information (F-TEID) and GGSN-U information (F-TEID) to the SGSN-C 91 as a response message to the Create UP Session Request message transmitted in the step S75 (S78). Note that a protocol other than the GTP protocol may be used for the above-described Create UP Session Request message and the Create UP Session Response message. Next, the SGSN-C 91 transmits a Create PDP Context Request message to the GGSN-C 92 by using a GTPv1 protocol (S79).

Next, the GGSN-C 92 transmits a Create PDP Context Response message to the SGSN-C 91 as a response message to the Create PDP Context Request message transmitted in the step S79 (S80). An Attach process in the step S80 and subsequent steps is similar to an Attach process specified in Non-patent Literature 1 and hence a detailed description thereof is omitted.

Further, in FIG. 14, although the SGSN-C 91 sets the RAI in the DNS Query message and transmits the DNS Query message in the step S74, it may set only the APN designated by the UE 50 without setting the RAI. In such a case, the DNS 46 transmits a response message in which the GGSN-C 92 associated only with the APN is set to the SGSN-C 91. The SGSN-C 91 receives the response message in which the GGSN-C 92 is set. However, depending on the configuration, the SGSN-C 91 may be able to determine whether there is a gateway apparatus in which the SGSN-U and the GGSN-U are integrally configured.

Further, even when the SGSN-C 91 cannot determine whether there is a gateway apparatus in which the SGSN-U and the GGSN-U are integrally configured, the SGSN-C 91 transmits the Create PDP Context Request message in which the Collocated flag is set to the GGSN-C 92. That is, when the SGSN-C 91 sets only the APN in the DNS Query message without setting the RAI and transmits the DNS Query message to the DNS 46, the SGSN-C 91 transmits the Create PDP Context Request message in which the Collocated flag is set to the GGSN-C 92 without determining whether or not there is the gateway apparatus. When there is a gateway apparatus in which the SGSN-U and the GGSN-U associated with the APN and the RAI included in the Create PDP Context Request message are integrally configured, the GGSN-C 92 performs processes similar to those in the step S80 and subsequent steps shown in FIG. 14. When there is no gateway apparatus in which the SGSN-U and the GGSN-U associated with the APN and the RAI included in the Create PDP Context Request message are integrally configured, the GGSN-C 92 may transmit an error message to the SGSN-C 91.

Seventh Embodiment

Figure 15:
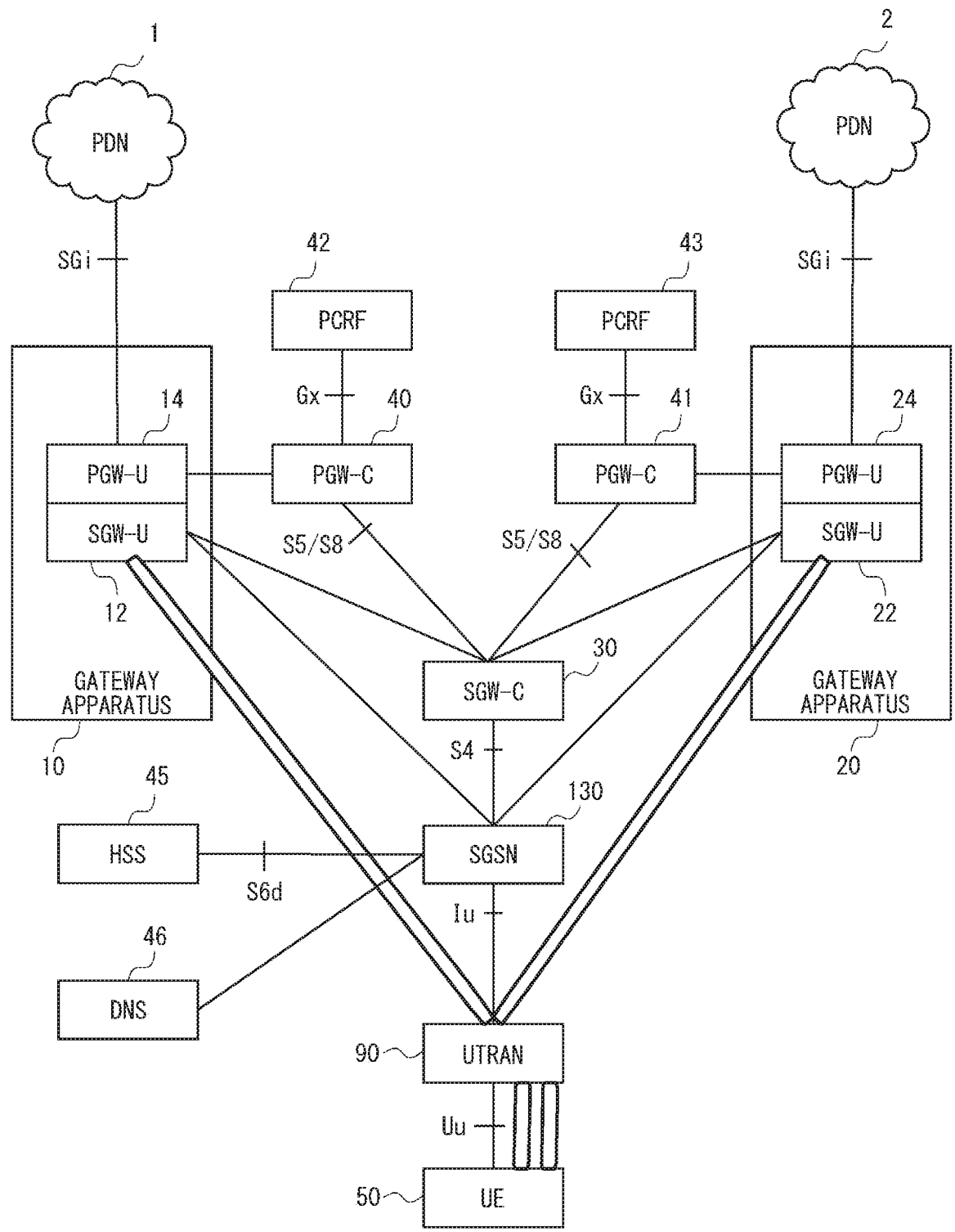
FIG. 15 is a configuration diagram of a communication system according to a seventh embodiment.

Next, a modified example of the communication system shown in FIG. 4 is described with reference to FIG. 15. In FIG. 15, a UTRAN 90 is used in place of the eNB 48 in FIG. 4, and an SGSN 130 is used in place of the MME 44. Note that in the SGSN 130, an SGSN-U and an SGSN-C are formed as an integrated apparatus. As described above, even when an SGSN specified in the 3GPP is used as a control apparatus, advantageous effects similar to those in the second embodiment can be obtained.

Next, configuration examples of the MME 44, the SGW-C 30, and the PGW-C 40 described in the above-described plurality of embodiments are described hereinafter.

Figure 16:
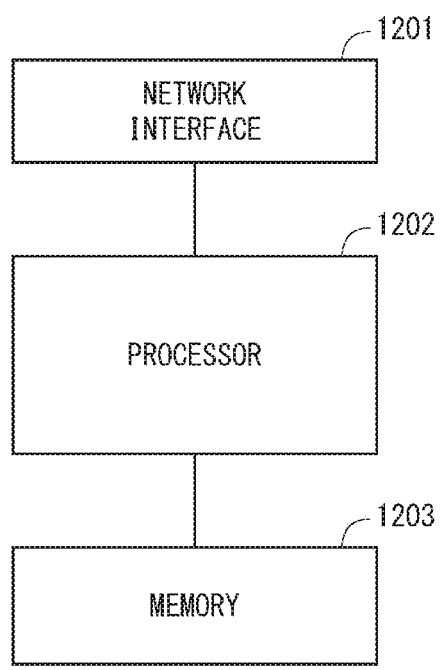
FIG. 16 is a configuration diagram of an MME, an SGW-C, and a PGW-C according to each embodiment.

FIG. 16 is a block diagram showing a configuration example of the MME 40, the SGW-C 30, and the PGW-C 40 (hereinafter referred to as the MME 40 and the like). As shown in FIG. 16, the MME 40 includes a network interface 1201, a processor 1202, and a memory 1203. The network interface 1201 is used for communication with a network node. The network interface 1201 may include, for example, a network interface card (NIC) in conformity with IEEE 802.3 series.

The processor 1202 performs processes performed by the respective MME 40 explained with reference to the sequence diagrams and the flowcharts in the above-described embodiments by loading a software module from the memory 1203 and executing the loaded software module. The processor 1202 may be, for example, a microprocessor, an MPU, or a CPU. The processor 1202 may include a plurality of processors.

The memory 1203 is formed by a combination of a volatile memory and a nonvolatile memory. The memory 1203 may include a storage disposed apart from the processor 1202. In this case, the processor 1202 may access the memory 1203 through an I/O interface (not shown).

In the example shown in FIG. 16, the memory 1203 is used to store a group of software modules. The processor 1202 can perform processes performed by the MME 40 explained in the above-described embodiments by loading the group of software modules from the memory 1203 and executing the loaded software modules.

As explained above with reference to FIG. 16, each of the radio relay apparatuses in the above-described embodiments executes one or a plurality of programs including a group of instructions to cause a computer to perform an algorithm explained above with reference to the drawings.

In the above-described examples, the program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Note that the present disclosure is not limited to the above-described embodiments and can be modified as appropriate without departing from the spirit and scope of the present disclosure. Further, the present disclosure may be carried out by combining above-described embodiments as appropriate with one another.

Although the present invention is explained above with reference to embodiments, the present invention is not limited to the above-described embodiments. Various modifications that can be understood by those skilled in the art can be made to the configuration and details of the present invention within the scope of the invention.

This application is based upon and claims the benefit of priority from Japanese patent applications No. 2016-006030, filed on Jan. 15, 2016, the disclosure of which is incorporated herein in its entirety by reference.

The whole or part of the embodiments disclosed above can be described as, but not limited to, the following Supplementary notes.

(Supplementary Note 1)

A communication system comprising:

a user plane PGW (Packet Data Network Gateway) configured to connect to a PDN (Packet Data Network);

a user plane SGW (Serving Gateway) configured to relay user plane data between the user plane PGW and a base station;

a control plane SGW configured to manage the user plane SGW; and a control apparatus configured to, when a plurality of connections are established for a communication terminal, transmit information indicating that the user plane SGW and the user plane PGW can be integrally configured to the control plane SGW for each of the plurality of connections.

(Supplementary Note 2)

The communication system described in Supplementary note 1, wherein when the control plane SGW receives the information indicating that the user plane SGW and the user plane PGW can be integrally configured from the control apparatus, the control plane SGW selects a first gateway apparatus in which a first user plane PGW and a first user plane SGW are integrally configured as an apparatus that establishes a connection between the apparatus and the base station for transmitting user data related to a first APN, the first user plane PGW being configured to connect to a PDN corresponding to the first APN, the first user plane SGW being configured to relay user plane data transmitted between the first user plane PGW and the base station, and the control plane SGW selects a second gateway apparatus in which a second user plane PGW and a second user plane SGW are integrally configured as an apparatus that establishes a connection between the apparatus and the base station for transmitting user data related to a second APN, the second user plane PGW being configured to connect to a PDN corresponding to the second APN, the second user plane SGW being configured to relay user plane data transmitted between the second user plane PGW and the base station.

(Supplementary Note 3)

The communication system described in Supplementary note 2, further comprising a control plane PGW configured to control the first and second user plane PGWs, wherein the control plane SGW transmits identification information of the first user plane PGW constituting the first gateway apparatus and identification information of the second user plane PGW constituting the second gateway apparatus to the control plane PGW.

(Supplementary Note 4)

The communication system described in Supplementary note 1, further comprising a control plane PGW configured to control the first and second user plane PGWs, wherein the control plane SGW transmits information indicating that the user plane SGW and the user plane PGW can be integrally configured to the control plane PGW, and when the control plane PGW receives the information indicating that the user plane SGW and the user plane PGW can be integrally configured from the control plane SGW, the control plane SGW selects a first gateway apparatus in which a first user plane PGW and a first user plane SGW are integrally configured as an apparatus that establishes a connection between the apparatus and the base station for enabling the communication terminal to transmit user data related to a first APN, the first user plane PGW being configured to connect to a PDN corresponding to the first APN, the first user plane SGW being configured to relay user plane data transmitted between the first user plane PGW and the base station, and the control plane SGW selects a second gateway apparatus in which a second user plane PGW and a second user plane SGW are integrally configured as an apparatus that establishes a connection between the apparatus and the base station for enabling the communication terminal to transmit user data related to a second APN, the second user plane PGW being configured to connect to a PDN corresponding to the second APN, the second user plane SGW being configured to relay user plane data transmitted between the second user plane PGW and the base station.

(Supplementary Note 5)

The communication system described in Supplementary note 4, wherein the control plane PGW transmit identification information of the first user plane SGW constituting the first gateway apparatus and identification information of the second user plane SGW constituting the second gateway apparatus to the control plane SGW.

(Supplementary Note 6)

The communication system described in any one of Supplementary notes 1 to 5, further comprising a management apparatus configured to: manage location information related to a base station and a user plane SGW in association with each other; manage an APN and a user plane PGW in association with each other; and manage the user plane SGW and the user plane PGW, and a gateway apparatus formed of the user plane SGW and the user plane PGW in association with each other, wherein the control apparatus designates the location information and the APN, and determines whether or not there is a gateway apparatus formed of a user plane SGW associated with the designated location information and a user plane PGW associated with the designated APN by using the management apparatus.

(Supplementary Note 7)

A communication system comprising:

a user plane GGSN (Gateway GPRS Support Node) configured to connect to a PDN (Packet Data Network);

a user plane SGSN (Serving GPRS Support Node) configured to relay user plane data between the user plane GGSN and a base station;

a control plane SGSN configured to manage the user plane SGSN; and a control apparatus configured to, when a plurality of connections are established for a communication terminal, transmit information indicating that the user plane SGSN and the user plane GGSN can be integrally configured to the control plane SGSN for each of the plurality of connections.

(Supplementary Note 8)

A control apparatus comprising:

a selection unit configured to select a control plane SGW for a communication terminal when a plurality of connections are established; and a communication unit configured to transmit information indicating that a user plane PGW and a user plane SGW can be integrally configured to the control plane SGW for each of the plurality of connections, the user plane PGW being configured to connect to a PDN, the user plane SGW being configured to relay user plane data between the user plane PGW and a base station.

(Supplementary Note 9)

A control apparatus comprising:

a selection unit configured to select a control plane SGSN for a communication terminal when a plurality of connections are established; and a communication unit configured to transmit information indicating that a user plane GGSN and a user plane SGSN can be integrally configured to the control plane SGSN for each of the plurality of connections, the user plane GGSN being configured to connect to a PDN, the user plane SGSN being configured to relay user plane data between the user plane GGSN and a base station.

(Supplementary Note 10)

A communication method comprising:

selecting a control plane SGW for a communication terminal when a plurality of connections are established; and transmitting information indicating that a user plane PGW and a user plane SGW can be integrally configured to the control plane SGW for each of the plurality of connections, the user plane PGW being configured to connect to a PDN, the user plane SGW being configured to relay user plane data between the user plane PGW and a base station.

(Supplementary Note 11)

A communication method comprising:

selecting a control plane SGSN for a communication terminal when a plurality of connections are established; and transmitting information indicating that a user plane GGSN and a user plane SGSN can be integrally configured to the control plane SGSN for each of the plurality of connections, the user plane GGSN being configured to connect to a PDN, the user plane SGSN being configured to relay user plane data between the user plane GGSN and a base station.

(Supplementary Note 12)

A program for causing a computer to:

select a control plane SGW for a communication terminal when a plurality of connections are established; and transmit information indicating that a user plane PGW and a user plane SGW can be integrally configured to the control plane SGW for each of the plurality of connections, the user plane PGW being configured to connect to a PDN, the user plane SGW being configured to relay user plane data between the user plane PGW and a base station.

(Supplementary Note 13)

A program for causing a computer to:

select a control plane SGSN for a communication terminal when a plurality of connections are established; and transmit information indicating that a user plane GGSN and a user plane SGSN can be integrally configured to the control plane SGSN for each of the plurality of connections, the user plane GGSN being configured to connect to a PDN, the user plane SGSN being configured to relay user plane data between the user plane GGSN and a base station.

REFERENCE SIGNS LIST

1 PDN
2 PDN
10 GATEWAY APPARATUS
12 SGW-U
14 PGW-U
20 GATEWAY APPARATUS
22 SGW-U
24 PGW-U
30 SGW-C
32 CONTROL APPARATUS
34 BASE STATION
36 COMMUNICATION TERMINAL
40 PGW-C
41 PGW-C
42 PCRF
43 PCRF
44 MME
45 HSS
46 DNS
48 ENB
50 UE
61 COMMUNICATION UNIT
62 SELECTION UNIT
63 DETERMINATION UNIT
71 COMMUNICATION UNIT
72 INSTRUCTION INFORMATION DETERMINATION UNIT
81 COMMUNICATION UNIT
82 INSTRUCTION INFORMATION DETERMINATION UNIT
83 APPARATUS SELECTION UNIT
90 UTRAN
91 SGSN-C
92 GGSN-C
93 SGSN-U
94 GGSN-U
95 SGSN-U
96 GGSN-U
97 GGSN-C
101 PDN
102 PDN
110 GATEWAY APPARATUS
120 GATEWAY APPARATUS
130 SGSN

The invention claimed is:

1. A communication method for a mobile communication system, the communication method comprising:

selecting, by a Mobility Management Entity (MME) or a Serving GPRS Support Node (SGSN) that performs mobility management of a communication terminal (UE), a Serving Gateway for control plane (SGW-C) and a Packet Data Network Gateway for control plane (PGW-C) that process control plane data related to the UE;

sending, by the MME or the SGSN, a Create Session Request message including an indication flag to the SGW-C and the PGW-C, wherein the indication flag indicates that a Serving Gateway for user plane (SGW-U) and a Packet Data Network Gateway for user plane (PGW-U) are combined; and selecting, by the SGW-C and the PGW-C, the combined SGW-U and PGW-U that processes user plane data related to the UE, based on the indication flag included in the Create Session Request message.

2. A mobile communication system comprising:

a Mobility Management Entity (MME) or a Serving GPRS Support Node (SGSN) configured to perform mobility management of a communication terminal (UE);

a Serving Gateway for control plane (SGW-C) configured to process control plane data related to the UE;

a Serving Gateway for user plane (SGW-U) configured to process user plane data related to the UE;

a Packet Data Network Gateway for control plane (PGW-C) configured to process control plane data related to the UE; and a Packet Data Network Gateway for user plane (PGW-U) configured to process user plane data related to the UE, wherein the MME or the SGSN selects the SGW-C and the PGW-C, wherein the MME or the SGSN sends a Create Session Request message including an indication flag to the SGW-C and the PGW-C, wherein the indication flag indicates that the SGW-U and the PGW-U are combined, and wherein the SGW-C and PGW-C select the combined SGW-U and PGW-U, based on the indication flag included in the Create Session Request message.

3. A Mobility Management Entity (MME) apparatus, comprising:

a processor that:

performs mobility management of a communication terminal (UE); and selects a Serving Gateway for control plane (SGW-C) and a Packet Data Network Gateway for control plane (PGW-C) that process control plane data related to the UE; and a transmitter configured to send a Create Session Request message including an indication flag, which indicates that a Serving Gateway for user plane (SGW-U) and a Packet Data Network Gateway for user plane (PGW-U) are combined, to the SGW-C and the PGW-C,
wherein the indication flag is used for selecting the combined SGW-U and PGW-U that processes user plane data related to the UE by the SGW-C and the PGW-C.

4. The MME apparatus according to claim 3, further comprising:
a receiver configured to receive a Create Session Response message from the SGW-C and the PGW-C.

5. A method for a gateway comprising:
processing control plane data related to a communication terminal (UE);
receiving a Create Session Request message including an indication flag from a Mobility Management Entity (MME) or a Serving GPRS Support Node (SGSN), wherein the indication flag indicates that a Serving Gateway for user plane (SGW-U) and a Packet Data Network Gateway for user plane (PGW-U) are combined; and
selecting the combined SGW-U and PGW-U that processes user plane data related to the UE based on the indication flag included in the Create Session Request message.

* * * * *